(12) United States Patent
Sunkara et al.

(10) Patent No.: US 12,357,967 B2
(45) Date of Patent: Jul. 15, 2025

(54) DESULFURIZATION AND SULFUR TOLERANT HYDROGENATION PROCESSES OF HYDROCARBON FEEDSTOCKS

(71) Applicant: Advanced Energy Materials, LLC, Louisville, KY (US)

(72) Inventors: Mahendra Sunkara, Louisville, KY (US); Sivakumar Vasireddy, Louisville, KY (US); Juan He, Louisville, KY (US)

(73) Assignee: ADEM Technologies Inc., Louisville, KY (US)

( * ) Notice: Subject to any disclaimer, the term of this patent is extended or adjusted under 35 U.S.C. 154(b) by 709 days.

(21) Appl. No.: 17/675,769

(22) Filed: Feb. 18, 2022

(65) Prior Publication Data

US 2022/0184580 A1 Jun. 16, 2022

Related U.S. Application Data

(63) Continuation-in-part of application No. 16/841,405, filed on Apr. 6, 2020, now Pat. No. 11,254,880, (Continued)

(51) Int. Cl.
*B01J 20/28* (2006.01)
*B01D 19/00* (2006.01)
(Continued)

(52) U.S. Cl.
CPC .... *B01J 20/28023* (2013.01); *B01D 19/0005* (2013.01); *B01J 20/06* (2013.01);
(Continued)

(58) Field of Classification Search
CPC ...... B01J 20/28023; B01J 35/23; B01J 20/06; B01D 19/0005; C10G 29/04; C10G 2300/202
(Continued)

(56) References Cited

U.S. PATENT DOCUMENTS 7,105,140 B2 9/2006 Price et al.
10,030,201 B1 7/2018 Sunkara et al.
(Continued)

FOREIGN PATENT DOCUMENTS

CN 104277874 A 1/2015
WO 2008137463 A2 11/2008

OTHER PUBLICATIONS

Gupta, M., et al. "Nanowire catalysts for ultra-deep hydrodesulfurization and aromatic hydrogenation." Applied Catalysis B: Environmental 180 (2016): 246-254. (Year: 2015).*
(Continued)

*Primary Examiner* — Anthony J Zimmer
*Assistant Examiner* — Annette Phan
(74) *Attorney, Agent, or Firm* — Law Office of J.L. Simunic; Joan L. Simunic

(57) ABSTRACT

The present invention is a method for removing sulfur from liquid hydrocarbon feedstocks and for performing hydrogenation reactions in sulfur-contaminated feedstocks, including the hydrogenation of naphthalene in the presence of sulfur compounds, using catalysts or adsorbents comprising metal oxide nanowires decorated with reduced catalytically-active metal particles. In a preferred embodiment, the adsorbent comprises zinc oxide nanowires decorated with catalytically-active metals selected from nickel, cobalt, molybdenum, platinum, palladium, copper, oxides thereof, alloys thereof, and combinations thereof. In some embodiments, the sulfur is removed through a desulfurization process without an external hydrogen supply. The process is effective for the removal of sulfur from diesel fuels and liquid fuel streams, and for deep desulfurization of natural gas streams. The process is also effective for the selective hydrogenation of naphthalene to tetralin in the presence of sulfur compounds.

12 Claims, 10 Drawing Sheets

Related U.S. Application Data which is a continuation-in-part of application No. 16/481,714, filed as application No. PCT/US2018/017355 on Feb. 8, 2018, now abandoned.

(60) Provisional application No. 62/457,695, filed on Feb. 10, 2017.

(51) Int. Cl.
| | |
|---|---|
| *B01J 20/06* | (2006.01) |
| *B01J 20/08* | (2006.01) |
| *B01J 20/12* | (2006.01) |
| *B01J 20/30* | (2006.01) |
| *B01J 23/755* | (2006.01) |
| *B01J 23/883* | (2006.01) |
| *B01J 35/23* | (2024.01) |
| *B01J 37/08* | (2006.01) |
| *C10G 25/00* | (2006.01) |
| *C10G 29/04* | (2006.01) |
| *C10G 29/16* | (2006.01) |

(52) U.S. Cl.
CPC ............... *B01J 20/08* (2013.01); *B01J 20/12* (2013.01); *B01J 20/28007* (2013.01); *B01J 20/3078* (2013.01); *B01J 20/3085* (2013.01); *B01J 23/755* (2013.01); *B01J 23/883* (2013.01); *B01J 35/23* (2024.01); *B01J 37/08* (2013.01); *C10G 25/003* (2013.01); *C10G 29/04* (2013.01); *C10G 29/16* (2013.01); *C10G 2300/202* (2013.01)

(58) Field of Classification Search
USPC ........................................................ 502/307
See application file for complete search history.

(56) References Cited

U.S. PATENT DOCUMENTS

| | | | |
|---|---|---|---|
| 2010/0025301 | A1 | 2/2010 | Borgna et al. |
| 2010/0068572 | A1* | 3/2010 | Segawa .............. B01J 20/28061 208/46 |
| 2016/0334359 | A1* | 11/2016 | Kim ..................... G01N 27/127 |
| 2020/0188873 | A1 | 6/2020 | Sunkara et al. |

OTHER PUBLICATIONS

Gupta, M. et al. Nanowire catalysts for ultra-deep hydrodesulfurization and aromatic hydrogenation. Applied Catalysis B: Environmental, 2016, 180: 246-254.

* cited by examiner

DESULFURIZATION AND SULFUR TOLERANT HYDROGENATION PROCESSES OF HYDROCARBON FEEDSTOCKS

CROSS-REFERENCE TO PRIOR APPLICATIONS

The present application claims priority to U.S. Patent Application 62/457,695 filed 2017 Feb. 10, and to PCT/US18/17355 filed 8 Feb. 2018, and to U.S. patent application Ser. No. 16/481,714 filed 29 Jul. 2019, currently, and to U.S. patent application Ser. No. 16/841,405 filed 6 Apr. 2020, currently, all of which are incorporated by reference in their entireties.

GOVERNMENT INTEREST

This invention was made with government support under grant number SC0015808 awarded by the U.S. Department of Energy. The government has certain rights in the invention.

FIELD OF THE INVENTION

The present invention relates to the use of adsorbents for (1) the removal of sulfur from diesel fuel and other hydrocarbon feedstocks; (2) the selective hydrogenation of naphthalene to tetralin in the presence of sulfur compounds; (3) the deep desulfurization of natural gas in a one-step process; (4) the deep desulfurization of FCC naphtha or gasoline without loss of octane number; and, (5) the deep desulfurization of alkylation feed without hydrogenation of olefins, wherein the adsorbents comprise metal oxide nanowires decorated with catalytically active metal particles or metal oxide alloys having nanowire morphology.

BACKGROUND OF THE INVENTION

Sulfur compounds in liquid hydrocarbon fuels can oxidize to $SO_x$ species and cause air pollution. Various regulations now mandate lowering the sulfur levels in motor fuels, such as gasoline and diesel, to less than 10 ppm. In addition, the presence of sulfur compounds in fuel oils can cause catalyst deactivation and corrosion in refining processes. This can create a commercial challenge because it is projected that the global demand for ultra-low sulfur diesel (ULSD; Sulfur=10-15 ppm) will increase significantly as more countries worldwide implement severe sulfur specifications. To achieve this, refiners will be required to upgrade poor quality feedstocks, such as light cycle oil (LCO), heavy gas oils, and sour crude products, to produce the required volumes of ULSD.

On-board reformers to power fuel cells in motor vehicles are becoming more popular as the public seeks more efficient energy sources. The on-board reformer enables the rapid and efficient delivery of hydrogen from a fuel source, such as natural gas, liquefied petroleum gas, landfill gas, digester gas, gasoline, diesel and jet fuel. However, these fuels contain sulfur as an impurity. The sulfur must be nearly completely removed, e.g., to a sulfur level <15 ppb and in some cases to a sulfur level of <1 ppb, to prevent poisoning of the reforming catalyst and fuel cell anode catalyst.

Natural gas contains 1-2 ppm $H_2S$ in addition to other sulfur species, such as carbonyl sulfide (COS), mercaptans (methyl mercaptan, ethyl mercaptan and $^t$butyl mercaptan) and thiophene, which account for another 3-4 ppm. For nearly any commercial application, the sulfur level in natural gas must be reduced to less than 100 ppb.

However, the removal of sulfur compounds from the hydrocarbon feedstock can provide a challenge in petroleum refining. For example, refractory thiophenic sulfur compounds are particularly difficult to remove. The prior art method requires a catalytic hydrodesulfurization process (HDS) in a trickle bed reactor operated at elevated temperatures (300-400° C.) and pressures (60-120 atm, $H_2$) using Co—Mo/$Al_2O_3$ and Ni—Mo/$Al_2O_3$ catalysts. The HDS process is effective in removing thiols, sulfides, and disulfides, but less efficient for thiophenes and thiophene derivatives. Moreover, the HDS process emits $H_2S$ gas which requires further downstream processing to eventually convert the $H_2S$ gas to elemental sulfur.

Noble metal catalysts can be employed with high performance at low temperature in the hydrogenation of aromatics, but are easily poisoned by sulfur compounds even at the ppm level. In the hydrogenation processes, it is common to use a two-stage hydrotreating process wherein the sulfur content of a feedstock is first reduced to a level of less than 2 ppm by ultra-deep hydrodesulfurization and then hydrogenation of aromatics in the feedstock is conducted in the second stage by using a noble metal catalyst. Unfortunately, the reduction of sulfur content in diesel fuel or crude oil derived chemicals to less than 2 ppm with HDS process is quite difficult and requires a huge investment.

Polishing processes, such as reactive adsorption, selective adsorption, oxidation/extraction desulfurization, or ultrasonic desulfurization, may be used to supplement the conventional HDS process. The oxidation/extraction desulfurization polishing processes have undesirable side reactions that reduce the quality and quantity of the fuel. The adsorption processes are attractive because of the straightforward operating conditions and availability of inexpensive and re-generable adsorbents. However, only a few adsorbents have shown high selectivity for difficult to hydrotreat sulfur compounds.

Thus, it would be beneficial to have a catalyst that is effective for removal of sulfur from liquid fuels, gas-phase naphtha, natural gas and feed gas for fuel cell applications. It would be particularly beneficial to have a catalyst effective for use in sulfur tolerant hydrogenation processes. Also, it is beneficial to have a method for the deep desulfurization of FCC naphtha that can be performed without reducing the olefin content thereby preventing reduction of the octane number. It is also beneficial to have a method that removes sulfur from a feed source for an alkylation unit that does not result in saturating olefins in the feed.

SUMMARY OF THE PRESENT INVENTION

The present invention is a catalytic adsorbent and a method for removing sulfur from liquid hydrocarbon feedstocks and for performing hydrogenation reactions in sulfur-contaminated feedstocks, including the hydrogenation of naphthalene in the presence of sulfur compounds, using catalysts or adsorbents comprising metal oxide nanowires decorated with reduced catalytically-active metal particles or metal oxide alloys with nanowire morphology. In a preferred embodiment, the adsorbent comprises zinc oxide nanowires decorated with catalytically-active metals selected from nickel, cobalt, molybdenum, platinum, palladium, ruthenium, copper, oxides thereof, alloys thereof, and combinations thereof, or zinc oxide nanowires alloyed with nickel.

Sulfur is removed from gas and liquid feeds using the metal oxide nanowire adsorbents, also referred to herein as nanometal oxide adsorbents. In some embodiments, the sulfur is removed through a desulfurization process in a fixed bed reactor. In some embodiments, the sulfur is removed through a desulfurization process in a batch reactor. In some embodiments, the sulfur is removed through a desulfurization process with an external hydrogen supply. In some embodiments, the sulfur is removed through a desulfurization process without an external hydrogen supply. In some embodiments, the sulfur is removed using a vapor phase process with P=1 atm. In some embodiments, the sulfur is removed using a liquid phase desulfurization process with P>1 atm.

The process is effective for the removal of sulfur from diesel fuels and liquid fuel streams reducing the sulfur concentration from about 130-200 ppm by weight to approximately 15 ppm by weight without generating undesirable $H_2S$ gas. The one-step process is effective for the deep desulfurization of a natural gas stream reducing the sulfur concentration from about 3-20 ppm by weight to less than 15 ppb by weight. The process is effective for the desulfurization of FCC naphtha reducing the sulfur concentration from about 30-100 ppm by weight to less than about 10 ppm without affecting the naphtha's octane number. The process is effective for the desulfurization of an alkylation feed source having about 70-100 ppm sulfur by weight, and reducing the sulfur concentration to less than about 5 ppm without simultaneously hydrogenating the olefin in the feed, wherein the process is effective at pressures equal to or greater than atmospheric pressure.

The nanometal oxide adsorbents are also effective for the selective hydrogenation of naphthalene to tetralin in the presence of sulfur compounds. For example, a naphthalene feedstock having a sulfur content of 300 ppm or lower can be subjected to a hydrogenation reaction using the nanometal oxide adsorbents to selectively produce tetralin or decalin, depending on process conditions.

DETAILED DESCRIPTION OF THE PRESENT DEVELOPMENT

The present development is a process for gas-phase ultra-deep desulfurization using a nanometal adsorbent comprising a metal oxide nanowire decorated with reduced catalytically-active metal particles, referred to herein as a "decorated nanowire", or a metal oxide alloy having a nanowire morphology, referred to herein as an "alloyed nanowire". As used herein, the term "catalyst(s)" may be used interchangeably with the term "adsorbent(s)" when referring to the inventive composition. As used herein, the phrase "decorated nanowire(s)" may be used interchangeably with the term "decorated nanowire adsorbent(s)" or "decorated metal oxide catalyst(s)" or "decorated metal oxide adsorbent(s)" or "decorated nanometal adsorbent(s)" when referring to the inventive composition. As used herein, the term "decorated" means to bind the specified catalytically-active metal particle(s) to the surface of the nanowire. As used herein, the phrase "alloyed nanowire(s)" may be used interchangeably with the term "alloyed nanowire adsorbent(s)" or "alloyed nanowire catalyst(s)" or "alloyed metal oxide adsorbent(s)" or "alloyed nanometal adsorbent(s)". As used herein, the term "alloyed" means to bind the specified catalytically-active metal particle(s) within, and not on the surface of, the nanowire.

The ultra-deep desulfurization process of the present invention generates no hydrogen disulfide ($H_2S_s$), requires the addition of little to no hydrogen, and can be performed at or near atmospheric pressure. As used herein, unless a specific pressure is stated, the term "atmospheric pressure" means about 1 atmosphere or about 1 bar pressure. Hydrogen addition, when required for the reaction, is held to less than 4 vol %, and may be added diluted in nitrogen or argon for vapor phase desulfurization conditions. The reactor pressure is held to less than 10 atmospheres, and is most preferably at about 1 atmosphere. For liquid phase desulfurization reactions, hydrogen is added at less than 200 SCF/barrel, which is significantly lower than the prior art usage of about 600-800 SCF/barrel. In some cases, the preferred amount of hydrogen is limited to less than the solubility of hydrogen under the reaction conditions.

Figure 1:
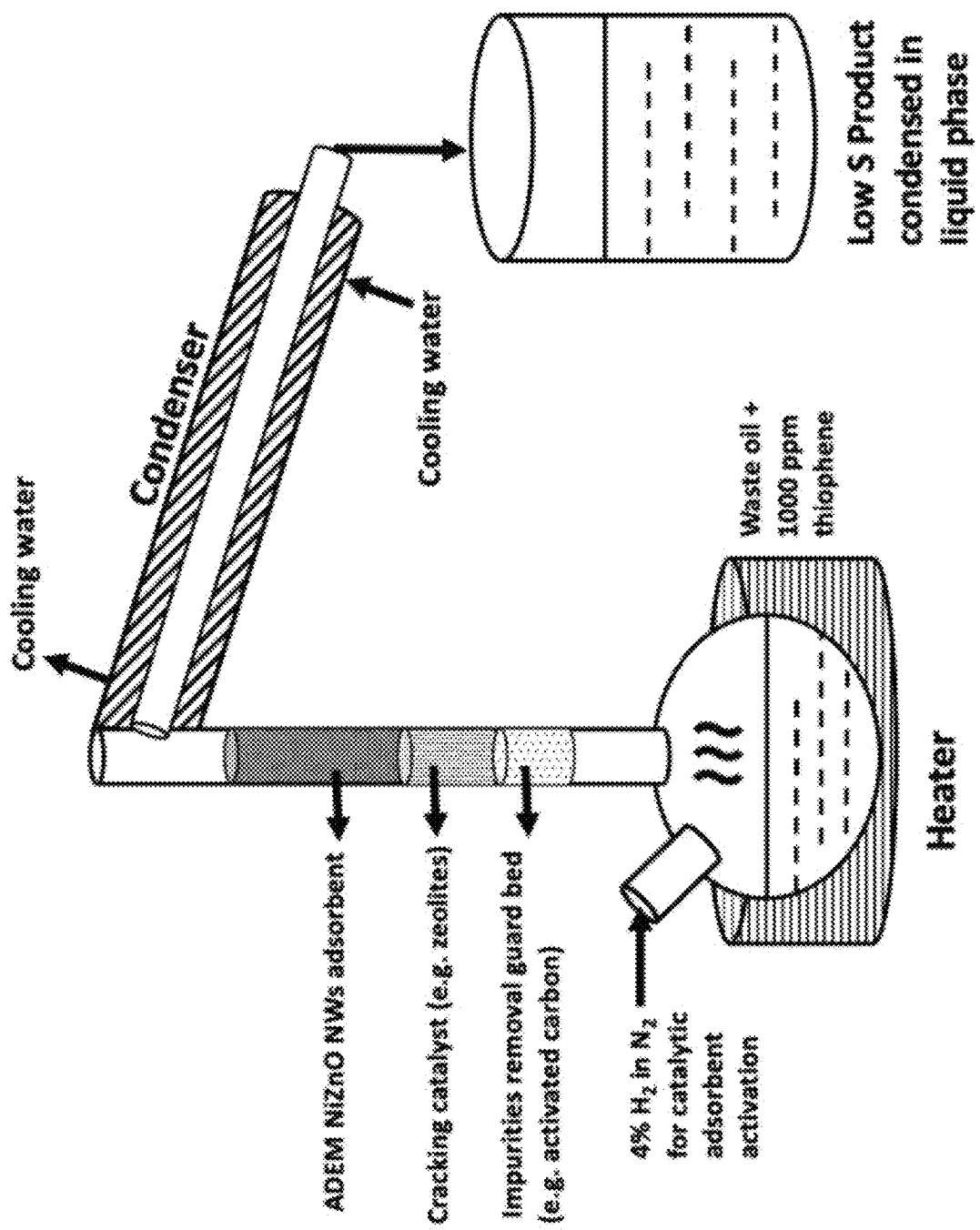
FIG. 1 is a schematic of an apparatus arrangement for performing the desulfurization process of the present invention on a laboratory scale.
Figure 2:
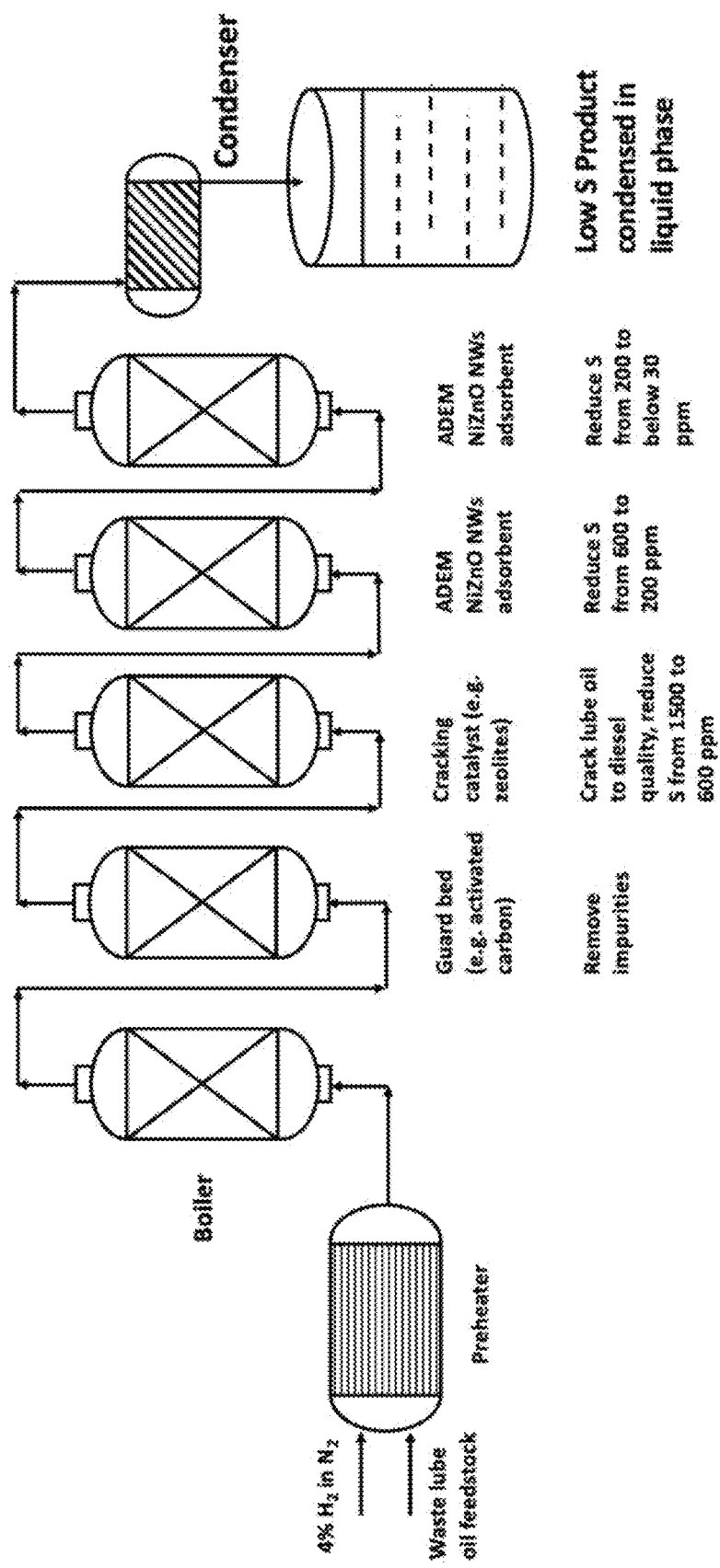
FIG. 2 is a schematic of an apparatus arrangement for performing the desulfurization process of the present invention on a production scale.

The desulfurization process apparatus comprises a heater, a guard bed, an optional cracking catalyst bed, a first adsorbent bed, and a condenser. Optionally, the apparatus may include a second adsorbent bed. The "heater" may be any means suitable for heating a sulfur-containing feedstock, and may include a preheater and a boiler. The cracking catalyst bed may be any thermal cracking process that can convert lube oil to diesel, and, as is known in the art, may or may not require a physical cracking catalyst. Heaters, preheaters, boilers, units for containing the guard beds and the cracking catalysts and the adsorbents, and condensers are known in the art. Exemplary arrangements for the components of the apparatus are shown in FIG. 1 for a laboratory or small-scale setup and in FIG. 2 for a larger production setup.

The process for vapor phase desulfurization comprises the steps of: (a) providing the desulfurization process apparatus; (b) providing the guard bed, the cracking catalyst bed, and the first adsorbent bed, and, optionally, a second catalyst bed; (c) providing a liquid sulfur-containing feedstock; (d) feeding the feedstock into the heater to convert the feedstock to a vapor phase; (e) passing the feedstock vapor through the guard bed to remove impurities; (f) passing the impurity-cleansed vapor through the cracking catalyst bed to reduce the sulfur content to between 600 ppm and 900 ppm; (g) passing the reduced sulfur vapor through the first adsorbent bed to reduce the sulfur content to less than 200 ppm; (h) optionally, passing the first adsorbent treated vapor through the second adsorbent bed to reduce the sulfur content to less than 30 ppm; (i) passing the second adsorbent treated vapor through a condenser; and (j) collecting the sulfur reduced product in a liquid phase. In a preferred embodiment, the sulfur is removed through the desulfurization process without an external hydrogen supply or with an intermittent external hydrogen supply. When hydrogen is used, it is on an intermittent basis, such as operating the desulfurization process without hydrogen for from about 12 hours to about 10 days and then adding hydrogen with the feedstock for about 2 hours and then stopping the hydrogen flow. In a preferred embodiment, the vapor phase desulfurization process apparatus includes a preheater that is heated to about 150° C. to remove the majority of any water that is present in the feedstock. The reduced water feedstock is then heated to about 450° C. to vaporize the feedstock.

The guard bed can be any material known in the art for removing impurities from a sulfur-containing feedstock, such as but not limited to activated carbon. The cracking catalyst bed can be any material known in the art for cracking sulfur-containing hydrocarbon feedstocks and reducing the sulfur content to less than 600 ppm. Exemplary cracking catalysts include, but are not limited to, zeolites.

The first adsorbent may be a decorated nanowire or an alloyed nanowire. When a second adsorbent is used, the second adsorbent may be the same as the first adsorbent, or a different first adsorbent and second adsorbent may be used. A decorated nanowire first adsorbent can be used in a system with a decorated nanowire second adsorbent, or a decorated nanowire first adsorbent can be used in a system with an alloyed nanowire second adsorbent, or an alloyed nanowire first adsorbent can be used in a system with an alloyed nanowire second adsorbent, or an alloyed nanowire first adsorbent can be used in a system with a decorated nanowire second adsorbent.

The process for liquid phase desulfurization is carried out in a fixed bed reactor and can be used to remove sulfur from FCC gasoline, from kerosene, and from alkylation feedstocks. The process for the liquid phase desulfurization process comprises the steps of: (a) providing the desulfurization process apparatus; (b) providing the guard bed and the adsorbent bed, wherein the adsorbent may be a decorated nanowire or an alloyed nanowire; (c) providing a liquid sulfur-containing feedstock; (d) passing the feedstock through the guard bed to remove impurities; (e) passing the impurity-cleansed liquid through the adsorbent bed to reduce the sulfur content to less than 30 ppm; (f) passing the adsorbent-treated liquid through a shell and tube heat exchanger and through a chiller; and (g) collecting the sulfur reduced product in a liquid phase. In a preferred embodiment for treatment of liquid feedstocks, the pressure is held between about 15 bar to about 30 bar and the adsorbent temperature is held between about 200° C. and 375° C. In a preferred embodiment, the sulfur is removed through the desulfurization process without an external hydrogen supply or with an intermittent external hydrogen supply. Optionally, hydrogen may be used at a very low hydrogen level, such as for desulfurization of FCC gasoline or alkylation feedstocks the hydrogen flow is <100 SCF/bbl or <3.5 mol %, or for the desulfurization of diesel, kerosene, or natural gasoline liquids the hydrogen flow is from about 100 SCF/bbl to about 250 SCF/bbl.

The process of the present invention is useful for the desulfurization of liquid fuel feedstocks and hydrocarbon feedstocks, such as waste lube oil, transmix fuels, diesel fuel, gasoline, naphtha, light cycle oil, diesel, jet fuel, kerosene, and combinations thereof. As used herein, the term "desulfurization" refers to the reduction of the sulfur level in a feedstock stream. As used herein, the term "deep desulfurization" means to reduce the sulfur level in a feedstock stream to a level equal to or less than 30 ppmv. As used herein, the term "ultra-deep desulfurization" means to reduce the sulfur level in a feedstock stream to a level equal to or less than 10 ppmv.

The process of the present invention is also useful for the deep desulfurization of natural gas streams in a single step process. Natural gas contains 1-100 ppm sulfur in the form of $H_2S$, COS, methyl mercaptan, ethyl mercaptan and $^t$butyl mercaptan, and thiophene, as the major sulfur species. Deep desulfurization, and specifically reducing the sulfur level to less than 100 ppb, is necessary for most commercial applications. Traditionally, this is achieved in two stages. In the first stage, the sulfur species are hydrogenated to $H_2S$ species using hydrogen and known hydrodesulfurization catalysts, such as precious metals decorated on alumina or silica supports, or using sulfided Ni—Mo particles or Co—Mo particles decorated on alumina or silica supports. In the second stage, the $H_2S$ is absorbed into the adsorbent bed with a direct gas-solid phase reaction. As is known in the art, the first stage reduces the natural gas to a sulfur level of about 2 ppm, and the second step further reduces the sulfur level to the ppb range. Using the process of the present invention, the sulfur level of a natural gas stream initially having a sulfur level of about 100 ppm can be reduced to a level of <15 ppb in a single pass without the use of hydrogen. Eliminating the need for a second desulfurization step enhances the utility of natural gas for processes such as fuel cell manufacturing processes, in ammonia production, and in fertilizer production. The desulfurization process of the present invention can also be achieved with low volumes of hydrogen added, e.g., hydrogen at concentrations of <2 vol % and as low as about 0.5 vol %. The process of the present invention can also tolerate the presence of water in addition to large volumes of hydrocarbons. Such reaction conditions are not conducive to the prior art two stage desulfurization processes.

When used with no hydrogen, the catalytic adsorbent of the present invention can be regenerated in-situ with short term use of low amounts of hydrogen. Without being bound by theory, it is believed that during this regeneration step, the sulfur is transferred to the underlying support material.

The process of the present invention is also effective for the selective hydrogenation of naphthalene to tetralin in the presence of sulfur compounds. As is known in the art, the naphthalene feed from a refinery can contain sulfur at levels as high as 4000 ppm and traditional hydrotreatment using conventional HDS catalysts can reduce the sulfur level down to ~100 ppm. Using the nanometal adsorbent, a naphthalene stream having a sulfur level of 300 ppm or lower can be hydrogenated to tetralin or decalin selectively depending on process conditions. This approach uses non-noble metal catalysts and has the capability to sustain the hydrogenation activity for the feed with sulfur as high as 300 ppm.

Decorated Nanometal Adsorbents

The decorated nanowire adsorbent is a metal oxide nanowire decorated with reduced catalytically-active metal particles. The metal oxide nanowire is selected from zinc oxide, iron oxide, manganese oxide, γ-alumina, or a combination thereof. The catalytically-active metal particles are selected from nickel, nickel-zinc alloys, cobalt, molybdenum, platinum, palladium, ruthenium, copper, nickel-copper alloys, and combinations thereof. The method for preparing the decorated nanowires provides that the catalytically-active metal particles remain on the surface of the metal oxide nanowire. Optionally, the adsorbent may further include a binder.

The decorated nanowire is prepared by loading catalytically-active metal particles onto metal oxide nanowires comprising zinc oxide, iron oxide, manganese oxide, γ-alumina, or a combination thereof. A preferred method for the production of zinc oxide nanowires is taught by Sunkara et al. in US Published Application 2012/0027955, which is incorporated herein in its entirety by reference. In a preferred embodiment, the metal oxide nanowire comprises from about 55 wt % to about 88 wt % of the adsorbent composition.

The catalytically-active metals are loaded onto the metal oxide nanowires via wet impregnation or incipient wetness techniques, as is known in the art. In a preferred embodiment, the adsorbents are prepared by conventional impregnation techniques using aqueous solution of metal nitrates or acetates. The catalytically-active metal may be in the form of an elemental metal or an oxide. Without being bound by theory, it is believed that the catalytically-active metals are present on the surface of the nanowires as particles. Without intending to limit the scope of the teachings or claims in any way, some representative examples of decorated metal oxide adsorbents include, but are not limited to Ni/ZnO, $Ni_{1-x}Zn_x$/ZnO, Ni—Cu/ZnO, $Ni_{1-x}Cu_x$/ZnO, Ni—Co/ZnO, Ni—Mo/ZnO, Ni—Pt/ZnO, Ni/ZnO—$Al_2O_3$, Ni/$Fe_2O_3$, Ni/$MnO_2$, Ni—Pt/$Fe_2O_3$, Ni—Pt/$MnO_2$, Ni—Mo/$MnO_2$, Ni—Co/$MnO_2$, Ni/$Fe_2O_3$—$Al_2O_3$, Ni/$MnO_2$—$Al_2O_3$.

Catalytically-active metal loading may vary from about 3 wt % to about 20 wt %. In a preferred embodiment, a first catalytically-active metal is loaded onto a metal oxide nanowire at a concentration of from about 3 wt % to about 20 wt %, and more preferably at a concentration of from about 6 wt % to about 15 wt %, and most preferably at a concentration of from about 12 wt %. Optionally, a second catalytically-active metal is loaded onto the metal oxide nanowire at a concentration of up to about 12 wt %, and more preferably at a concentration of from about 4 wt % to about 9 wt %, and most preferably at a concentration of about 6 wt %. In an exemplary embodiment, the first catalytically-active metal is nickel and the second catalytically active metal is selected from the group consisting of zinc, palladium, platinum, cobalt, molybdenum, copper, and combinations thereof.

Optionally, as is known in the art, a binder, such as alumina, bentonite clay, boehmite, or combinations thereof, may be added to the adsorbent to improve crushing strength. In an exemplary embodiment, alumina is added to the composition at a concentration of from about 0 wt % to about 30 wt %. The binder must be added to the adsorbent after the catalytically-active metals are impregnated onto the metal oxide nanowires to prevent formation of undesired byproducts during the desulfurization process.

An exemplary method for preparation of the decorated nanowires comprises the steps of: (a) providing the metal oxide nanowire; (b) dispersing the nanowire in water; (c) decorating the metal oxide nanowire with the catalytically-active metal, wherein the catalytically-active metal is provided as an aqueous solution and is added dropwise to the dispersed nanowire; (d) heating the nanowire—decorating metal solution of step (c) for a predetermined time period and at predetermined temperatures until a thick paste forms; (e) adding the binder to the paste and mixing for a predetermined time period at a predetermined temperature; (f) extruding the paste to form extrudates and drying the extrudates; (g) calcining the dried extrudates; (h) reducing the decorating metal on the calcined extrudates by heating the composition in a reactor while flowing nitrogen gas ($N_2$) over the composition and then starting a flow of hydrogen gas ($H_2$) over the composition as the reactor temperature is raised to a predetermined temperature and then holding the composition at the predetermined temperature with a $H_2$ gas flow; and, (i) cooling the reactor to a desulfurization temperature and stopping the hydrogen gas flow when the desired process temperature is reached.

Suitable drying temperatures for the extrudates will depend on the particular adsorbent, but a general range would be from about 100° C. to about 150° C., and preferably at about 120° C. Suitable calcining temperatures will depend on the particular adsorbent, but a general range would be from about 400° C. to about 500° C., and preferably at about 430° C. Exemplary extrudates are cylindrical shaped with diameters of about 1.2 mm to 4.5 mm. It is anticipated that the catalyst can be extruded into a trilobe shape and other shapes and extrudate sizes that are known in the art. In a preferred embodiment, the extrudates are about 1.2 mm in diameter and about 5 mm to 10 mm in length, and the extruded adsorbent is calcined in a furnace at a temperature of from about 400° C. for a period of about 2 hours.

The calcined extrudates are then activated in situ in the fixed bed reactor at a temperature of from about 350° C. to about 430° C. before the adsorbent is used in the desulfurization process. In a preferred embodiment, the catalyst is activated in the presence of hydrogen gas with the adsorbent bed at a temperature of about 150° C. to about 200° C. In a more preferred embodiment, the hydrogen is provided as 4% $H_2$ in $N_2$ gas.

Alloyed Nanometal Adsorbents

The alloyed nanowire adsorbent is a metal oxide nanowire having catalytically-active metal particle(s) located within, and not on the surface of, the nanowire. The metal oxide nanowire preferably comprises zinc oxide. The catalytically-active metal particles are selected from nickel metal or copper metal or a combination thereof. The method for preparing the decorated nanowires provides that the catalytically-active metal particles become alloyed with the metal oxide nanowire. Optionally, the adsorbent may further include a binder. The alloyed nanowire adsorbent does not require reduction, or activation, of the adsorbent.

An exemplary method for preparation of the alloyed nanowire comprises the steps of: (a) providing a zinc oxide nanowire powder; (b) dispersing the nanowire in water to form a slurry; (c) providing a catalytically-active metal selected from nickel metal or copper metal or a combination thereof as an aqueous solution, wherein the catalytically-active metal may be provided in a precursor form; (d) adding the catalytically-active metal solution dropwise to the nanowire slurry while controlling the pH between 7.0-9.0;

(e) drying the nanowire—active metal slurry of step (d) at a temperature of from about 80° C. to about 150° C., and preferably from about 100° C. to about 120° C., for a predetermined time period until a thick paste or powder forms; (f) calcining the powder in a furnace under inert atmosphere or at vacuum conditions at a calcination temperature of from about 180° C. to about 600° C., and preferably from about 220° C. to about 400° C., for a predetermined time period of from about 2 hr to about 8 hr, and preferably from about 3 hr to about 6 hr; (g) cooling the reactor and calcined powder to ambient temperature; (h) adding water and from about 7 wt % to about 12 wt % binder to the calcined powder and mixing for form a paste; (i) extruding the paste of step (h) to form extrudates, preferably of from about 1 mm to about 4.2 mm cylinder size in diameter; and, (j) drying the extrudates in a vacuum oven at a temperature of from about 80° C. to about 200° C., and preferably from about 100° C. to about 150° C., for a predetermined time. With respect to step (c), the catalytically-active precursor form may be an acetate, a nitrate, a formate, an oxalate, or another form generally known in the art as catalytically-active metal precursors.

In a preferred embodiment, the alloyed nanowire adsorbent comprises nickel or copper at a concentration of from about 6 wt % to about 16 wt %, and preferably from about 10 wt % to about 14 wt %; and the alloyed nanowire adsorbent comprises zinc oxide nanowires at a concentration of from about 70 wt % to about 88 wt %. In the alloyed nanowire adsorbent, the active metals in the metallic state are alloyed with the ZnO nanowires. This differs from the methods that produce an adsorbent wherein the active metal is in an oxide form.

EXAMPLES

The following examples are intended to provide the reader with a better understanding of the invention. The examples are not intended to be limiting with respect to any element not otherwise limited within the claims.

Apparatus Arrangement: The apparatus was assembled as shown in FIG. 1. Unless otherwise specified in the examples, about 25 g of activated carbon was loaded into a reactor column as the guard bed, about 1-2 cm thickness glass wool was placed atop the guard bed, optionally about 25 g zeolite was placed onto the glass wool as the cracking catalyst, then another 1-2 cm thickness layer of glass wool was added, then about 25 g first adsorbent was packed into the bed, then another 1-2 cm thickness layer of glass wool was added, then about 25 g second adsorbent was packed into the bed.

Desulfurization Using Decorated Nanowire Adsorbents: It has been found that the nickel-decorated zinc oxide nanowire adsorbent is useful for the desulfurization of liquid fuel feedstocks and hydrocarbon feedstocks, such as waste lube oil, transmix fuels, diesel fuel, gasoline, naphtha, light cycle oil, diesel, jet fuel, kerosene, and combinations thereof. Further, the Ni/ZnO decorated adsorbent of the present invention is effective for sulfur pickup at significantly higher levels than prior art catalysts or adsorbents. Specifically, the Ni/ZnO decorated adsorbent of the present invention has a sulfur pickup equal to or greater than 150 mg S/g catalyst, and more preferably has a sulfur pickup equal to or greater than 180 mg S/g catalyst, and most preferably has a sulfur pickup equal to or greater than 220 mg S/g catalyst. Using the Ni/ZnO decorated adsorbent to treat a diesel feedstock reduces the sulfur level from 300 ppm down to <5 ppm, and results in fuel upgrading (increased cetane number) by increasing the cetane number from 48 to 60. For this application, hydrogen is included in the process and the amount of hydrogen required is about 600-1000 SCF/barrel. Using the Ni/ZnO decorated adsorbent to treat a naphtha feed having 1000 ppm thiophene sulfur at 350° C. and 20 bar results in deep desulfurization with the sulfur level after treatment at <5 ppm sulfur, and shows the decorated adsorbent has a pickup capacity equal to 20 wt %.

Decorated Nanowire Adsorbent Preparation, Example 1

A 12% Ni-88% ZnO decorated nanowire adsorbent is prepared by dispersing 8.8 g of ZnO nanowires in distilled $H_2O$ and subjecting the nanowires to sonication for about 5 minutes. An aqueous solution of 7.62 g nickel acetate tetrahydrate is then added dropwise while stirring and while maintaining the nanowire solution pH at 9.0 using $NH_4OH$ solution. Stirring is continued for about 20 min after completion of addition and the nanowire nickel acetate solution is held in an oven at about 80° C. for approximately 15 hours. The oven temperature is then raised to about 150° C. and held at 150° C. for 3 h until a thick paste forms. No binder is added. The paste is then extruded and the extrudates are dried at about 150° C. for approximately 1 hour. The dried extrudates are then calcined at about 400° C. for approximately 2 h in static air.

Decorated Nanowire Adsorbent Preparation, Example 2

A 12% Ni-58.7% ZnO-29.3% $Al_2O_3$ decorated nanowire adsorbent is prepared according to the method of Example 1 except 8.8 g of ZnO nanowires and 4.39 g of $\gamma$-$Al_2O_3$ powder are dispersed in distilled $H_2O$ and the aqueous solution comprises 7.62 g nickel acetate. No binder is added.

Decorated Nanowire Adsorbent Preparation, Example 3

A 12% Ni-58.7% ZnO-29.3% $Al_2O_3$ decorated nanowire adsorbent is prepared according to the method of Example 1 except the nickel acetate solution is adjusted to pH 9 with $NH_4OH$ solution before addition to the nanowire solution. No binder is added.

Decorated Nanowire Adsorbent Preparation, Example 4

A 6% Ni-6% Co-58.7% ZnO-29.3% $Al_2O_3$ decorated nanowire adsorbent is prepared according to the method of Example 1 except 8.8 g of ZnO nanowires and 4.39 g of $\gamma$-$Al_2O_3$ powder are dispersed in distilled $H_2O$ and the aqueous solution comprises 3.81 g nickel acetate and 3.8 g of cobalt acetate tetrahydrate. No binder is added.

Decorated Nanowire Adsorbent Preparation, Example 5

An 11% Ni-81% ZnO-8% boehmite decorated nanowire adsorbent is prepared by adding 7.62 g nickel acetate tetrahydrate to distilled water adjusted to a pH of 9.0 using $NH_4OH$, and then adding 8.8 g ZnO to the nickel solution and mixing for about 20 minutes, and then drying the mixture in an oven set at about 110° C. for approximately 15 hours to produce a powder. The dried powder is calcined in a furnace at about 420° C. for approximately 3 h. The calcined powder is then mixed with 0.9 g boehmite powder as a binder. About 15 wt % water is added to form a paste, and the paste is then extruded as trilobes having a diameter of about 1.8 mm.

Sulfur Removal Using Decorated Nanowire Adsorbents: The nickel decorated zinc oxide adsorbents were tested for sulfur removal under varying conditions. The desulfurization testing was done using either a model hydrocarbon stream spiked with from about 100 ppm to about 500 ppm sulfur by weight with an assortment of refractory sulfur species to closely resemble industrial conditions or with a diesel fuel sample obtained from an oil refinery and having about 100 ppm to about 500 ppm sulfur by weight and further containing an assortment of refractory sulfur species to closely represent industrial conditions. To perform the testing, fresh adsorbent—the metal coated nanowires—is packed into a stainless steel fixed bed reactor. To improve contact of the hydrocarbon feedstock that is to be subjected to desulfurization it is recommended that the adsorbents be extruded as particles with dimensions of about 1.2 mm-4 mm diameter, and preferably from about 2 mm-4 mm diameter, and a length of about 5 mm-10 mm.

The adsorbent is pretreated by heating the reactor to a temperature of about 150° C. and flowing nitrogen gas ($N_2$) over the adsorbent bed for about 2 hours and then reducing the adsorbent by starting a flow of hydrogen gas ($H_2$) over the adsorbent bed as the reactor temperature is raised over a period of about 2 hours from a temperature of about 150° C. at a temperature of between about 410° C. and about 430° C. and then holding the adsorbent bed at 430° C. with a $H_2$ gas flow, preferably 4% $H_2$ gas flow, for an additional 2 hours to 4 hours. Following pretreatment and reduction, the reactor temperature is cooled to a desulfurization temperature of 220° C. to about 425° C., more preferably at 290° C. to 300° C. Using 4% $H_2$ gas flow, the fixed-bed reactor is pressurized to 5-30 bar, more preferably at 15-20 bar. The hydrogen flow is stopped when the desired process temperature is reached.

An alternative method for reducing the catalyst can be used when the decorated nanowire adsorbent is nickel on zinc oxide nanowires. The first adsorbent and second adsorbent are packed into the apparatus as indicated in the Apparatus Arrangement. The first adsorbent and second adsorbent are reduced by slowly heating the reactor column over a period of about 1.5 hours to a temperature of about 400° C. while passing a 4% hydrogen balanced with nitrogen gas through the column at a 60 cc $min^{-1}$ flow rate. The reactor column is held at about 400° C. for about 2 hours with the hydrogen gas being allowed to flow through the beds in the reactor column. After the adsorbents are reduced, the desulfurization process is started. While holding the reactor column at about 400° C. and with the hydrogen flow continuing, a flow of waste lube oil is started with a LHSV of 0.5 $h^{-1}$ to 1 $h^{-1}$. When the waste lube oil reaches the heater, the hydrogen gas flow is stopped. The waste lube oil flow continued for about 120 hours and samples were collected from the exit of the condenser.

After the decorated nanowire adsorbents are reduced, a hydrocarbon feedstock then passes through the adsorbent at atmospheric pressure and at a liquid hourly space velocity (LHSV) of 0.5 $h^{-1}$ to 4 $h^{-1}$, more preferably at a LHSV of 1 $h^{-1}$ to 2 $h^{-1}$, most preferably at a LHSV of 1 $h^{-1}$. The hydrocarbon feedstock may be a sulfur containing liquid hydrocarbon, such as waste lube oil, transmix fuels, diesel fuel, gasoline, naphtha, kerosene, oil from pyrolyzing tires and plastics. To best replicate actual industrial conditions, the waste lube oil tested had a starting thiophenic sulfur concentration of from about 500 ppm to about 1500 ppm an including about 50 ppm to 100 ppm of refractory sulfur compounds such as benzothiophene, dibenzothiophene, 4,6-dimethyldibenzothiophene; the transmix fuels had a starting sulfur concentration of from about 1000 ppm to about 1500 ppm; and the diesel fuel had a starting sulfur concentration of from about 500 ppm to about 1500 ppm. The solid impurities are filtered off prior to desulfurization. In a preferred embodiment, a 2-stage process is used wherein the feedstock passes through the adsorbent in a first stage to reduce the sulfur level to less than about 200 ppm and then the reduced sulfur feedstock passes through a bed of fresh adsorbent a second time to further reduce the sulfur concentration.

Decorated Nanowire Example 6

Using the Apparatus Arrangement as shown in FIG. 1, about 15 g of the 12% Ni-58.7% ZnO-29.3% $Al_2O_3$ decorated nanowire adsorbent from Example 3 is packed into a fixed bed reactor along with 5 g activated carbon and 5 g molecular sieves 13X, with the materials packed into the reactor such that the feedstock initially contacts the activated carbon and then the molecular sieves 13X and then the decorated nanowire adsorbent, and then the feedstock exits the reactor. Prior to introduction of the feedstock, the decorated nanowire adsorbent is pretreated and reduced, and the hydrogen gas flow is stopped. The reactor is then heated to a temperature of about 390° C. and atmospheric pressure. The hydrocarbon feedstock, a waste lube oil with 900 ppm sulfur, is preheated to vaporize the feedstock. The feedstock is pumped from a bottom inlet of the reactor and passes through the adsorbent at a liquid hourly space velocity of 1 to 3 $h^{-1}$ before exiting at a top outlet of the fixed bed reactor and condensing to a liquid. Table 2 shows the sulfur concentration from samples recovered at the outlet after various times on-stream.

TABLE 2

| Time on stream (h) | LHSV ($h^{-1}$) | Sulfur concentration at outlet (ppm) |
|---|---|---|
| 4.3 | 1 | 203.99 |
| 7.8 | 2 | 127.2 |
| 11.5 | 3 | 167.2 |

Decorated Nanowire Example 7

The feedstock exiting the outlet from Example 6 is then fed through fresh 12% Ni-58.7% ZnO-29.3% $Al_2O_3$ decorated nanowire adsorbent in a reactor and under the same conditions as described in Example 6 to further reduce the sulfur concentration. Table 3 shows the sulfur concentration from samples recovered at the outlet after various times on-stream from this second-stage processing.

TABLE 3

| Time on stream (h) | LHSV ($h^{-1}$) | Sulfur concentration at outlet (ppm) |
|---|---|---|
| 3.5 | 2 | 53.5 |
| 12.2 | 1 | 67 |
| 14.5 | 1 | 76 |
| 6.6 | 0.5 | 58.5 |
| 18.7 | 0.5 | 43.8 |
| 25.2 | 0.5 | 47 |

Decorated Nanowire Example 8

Example 6 is repeated with 17.5 g of the 12% Ni-58.7% ZnO-29.3% Al$_2$O$_3$ decorated nanowire adsorbent, and the waste lube oil feedstock is replaced with a diesel feed obtained from a local gas station spiked to 470 ppm sulfur with 95% thiophene and 5% a combination of benzothiophene (BT), dibenzothiophene (DBT), 4,6-dimethyldibenzothiophene (DMDBT), and 4-methyldibenzothiophene (MDBT). More than 95% of thiophenes and benzothiophenes are removed during 48 hours of operation.

Decorated Nanowire Example 9

Figure 3:
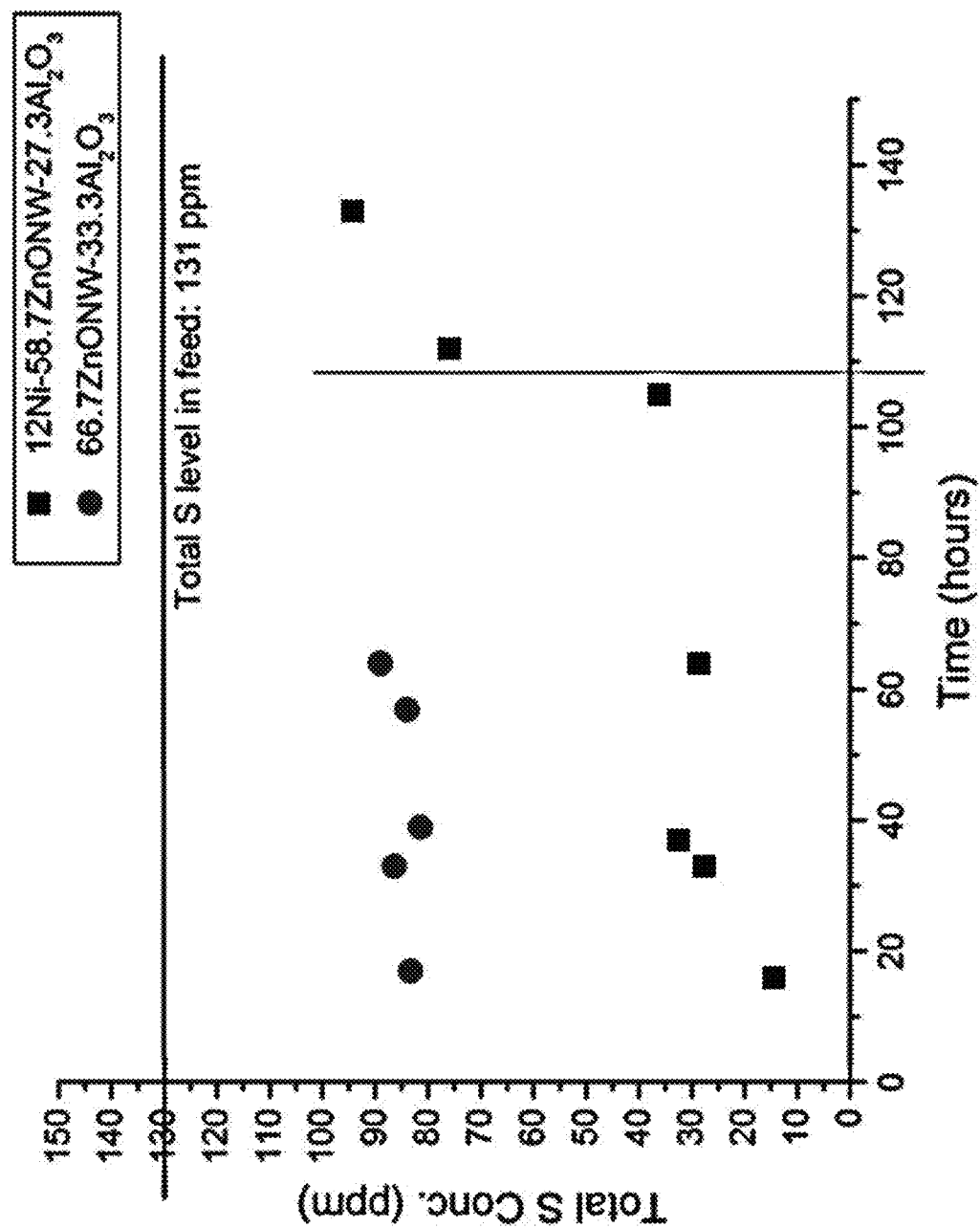
FIG. 3 is a graph showing the sulfur level over time for gas phase sulfur adsorption using a 12% Ni-58.7% ZnO-29.3% $Al_2O_3$ decorated nanowire adsorbent at P=1 atm, T=380° C.

Example 8 is repeated with 17.5 g of the 12% Ni-58.7% ZnO-29.3% Al$_2$O$_3$ decorated nanowire adsorbent. The diesel feed is preheated to a vapor phase and pumped to the adsorbent bed from the bottom of the packed bed reactor. No external hydrogen is added during the process. As shown in FIG. 3, more than 95% of thiophenes and benzothiophenes are removed during over 110 hours of operation.

Decorated Nanowire Example 10

Example 8 is repeated with 17.5 g of the 6% Ni-6% Mo-58.7% ZnO-29.3% Al$_2$O$_3$ decorated nanowire adsorbent, and the waste lube oil feedstock is replaced with a diesel feed obtained from a local gas station spiked to 470 ppm sulfur with 95% thiophene and 5% a combination of benzothiophene (BT), dibenzothiophene (DBT), 4,6-dimethyldibenzothiophene (DMDBT), and 4-methyldibenzothiophene (MDBT). More than 95% of thiophenes and benzothiophenes are removed during 24 hours of operation.

Decorated Nanowire Example 11

Example 6 is repeated except 30 g of the 12% Ni-58.7% ZnO-29.3% Al$_2$O$_3$ decorated nanowire adsorbent containing 15 wt % alumina binder is used. The waste lube oil with 900 ppm sulfur is vaporized and passes through the adsorbent at a LHSV of 0.5 h$^{-1}$ before exiting at a top outlet of the fixed bed reactor and condensing to a liquid. Table 4 shows the sulfur concentration from samples recovered at the outlet after various times on-stream.

TABLE 4

| Time on stream (h) | LHSV (h$^{-1}$) | Sulfur concentration at outlet (ppm) |
|---|---|---|
| 18 | 0.5 | 58.5 |
| 31.2 | 0.5 | 51.4 |
| 42.3 | 0.5 | 43.8 |

Decorated Nanowire Example 12

Example 6 is repeated except the 5 g activated carbon and 5 g molecular sieves 13X are replaced with Selexsorb® with ⅛" diameter spheres from BASF, and the waste lube oil feedstock is replaced with terapure oil (T-120) oil with 900 ppm sulfur and the feedstock passes through the adsorbent at a LHSV of 1 h$^{-1}$. Table 5 shows the sulfur concentration from samples recovered at the outlet after various times on-stream.

TABLE 5

| Time on stream (h) | LHSV (h$^{-1}$) | Sulfur concentration at outlet (ppm) |
|---|---|---|
| 4 | 1 | 263.602 |
| 6.333 | 1 | 61.184 |
| 11.683 | 1 | 13.565 |
| 23.750 | 1 | 19.625 |
| 32.167 | 1 | 27.860 |

Decorated Nanowire Example 13

30 g of the 12% Ni-88% ZnO decorated nanowire adsorbent from Example 1 is packed into a fixed bed reactor along with 5 g activated carbon and 5 g molecular sieves 13X, with the materials packed into the reactor such that the feedstock initially contacts the activated carbon and then the molecular sieves 13X and then the decorated nanowire adsorbent, and then the feedstock exits the reactor. Prior to introduction of the feedstock, the decorated nanowire adsorbent is pretreated in N$_2$ at 150° C. for about 2 hours and then the decorated nanowire adsorbent is reduced at 430° C. for an additional 2 hours, and the hydrogen gas flow is stopped. The reactor is then heated to a temperature of 300° C. and atmospheric pressure. The hydrocarbon feedstock, a diesel fuel from a refinery in Australia having a sulfur level of 200 ppm comprising various refinery sulfur compounds, including benzothiophene, dibenzothiophene, 4,6-dimethyldibenzothiophene, is pumped from a bottom inlet of the reactor and passes through the adsorbent at a LHSV of 1 to 2 h$^{-1}$ before exiting at a top outlet of the fixed bed reactor and being collected. Using the method of the present invention, the sulfur level is reduced in the diesel fuel from 200 ppm to less than 25 ppm.

Decorated Nanowire Example 14

Figure 4:
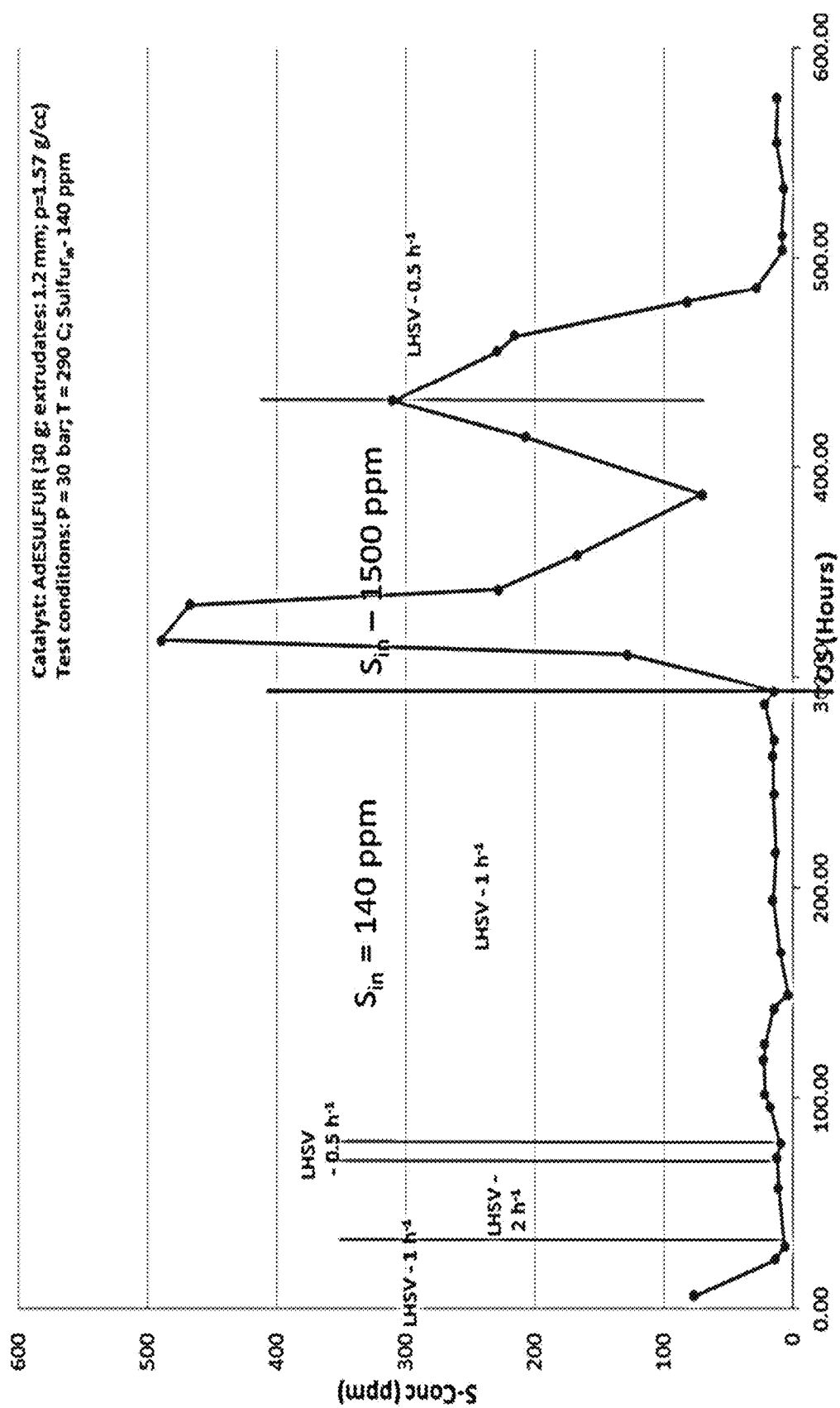
FIG. 4 is a graph showing the sulfur level over time for the ultra-deep desulfurization of diesel process using a nickel decorated ZnO nanowire adsorbent at P=30 bar, T=290° C., LHSV=variable.

To demonstrate that the process of the present invention can perform ultra-deep desulfurization and can be used as a polishing/upgrading technology in conjunction with hydrodesulfurization process, Example 13 was repeated with 30 g of Ni/ZnO decorated nanowire adsorbent, the diesel fuel feedstock was spiked to deliver 140 ppm thiophenic sulfur species (80 ppmw thiophene, 15 ppmw benzothiophene, 15 ppm dibenzothiophene, 15 ppmw 4-methyl dibenzothiophene, and 15 ppmw dibenzothiophene), the reactor temperature was set at 290° C. and the reactor pressurized to 30 bar. The spiked diesel fuel feedstock passed through the decorated nanowire adsorbent initially at an LHSV=1 h$^{-1}$ and the H$_2$/oil=150 SCCM/ml. After about 35 hours on stream, the feed rate was adjusted to an LHSV=2 h$^{-1}$ for about 30 hours, with no significant change in adsorption observed. The LHSV was then adjusted to 0.5 h$^{-1}$ for about 5 hours, with no significant change in adsorption observed. After 75 hours on stream, the feed rate was returned to LHSV=1 h$^{-1}$ using the 140 ppm sulfur spiked diesel fuel for an additional 225 hours. As shown in FIG. 4, sulfur concentration at the outlet was decreased to less than 40 ppm. After 300 hours on stream, the feedstock was spiked to deliver 1500 ppm sulfur with the LHSV=1 h$^{-1}$ and while maintaining all other reaction conditions. After an initial spike in sulfur output, the sulfur output level decreased, but sulfur breakthrough was still observed. After 440 hours on stream, the feed rate was adjusted to LHSV=0.5 h$^{-1}$ and the sulfur output was reduced to about less than 10 ppm.

The method of the present invention, and particularly using the Ni/ZnO decorated nanowire adsorbent or the $Ni_{1-x}Zn_x/ZnO$ decorated nanowire adsorbent, has proven effective for long-term performance and sulfur pickup capacity. In field studies, it has been demonstrated that the nickel-zinc decorated nanowire adsorbent sulfur removal efficiency was two-times greater than a nickel-zinc non-nanowire catalyst for reactions in the temperature range of 300-400° C. It has also been found that the lifetime of the nickel-zinc decorated nanowire adsorbent is 1.5 times longer than a similar non-nanowire product. Based on the results from Example 10A, the sulfur pickup for the Ni/ZnO decorated nanowire adsorbent of the present invention is found to be 223 mg sulfur/g catalyst after 570 hours of operation (a total of 6.7 g sulfur was picked up 30 g adsorbent), and the decorated nanowire adsorbent was still active. As indicated in Table 6, this represents a significant improvement over the prior art.

TABLE 6

| Catalyst/Adsorbent | Reaction Conditions | Sulfur pickup capacity |
|---|---|---|
| Ni—ZnO[1] | FCC gasoline | 25.4 mg S/g catalyst |
| Ni—ZnO—$Al_2O_3$—$SiO_2$ prepared by coprecipitation[2] | Diesel fuel w 1187 ppm sulfur | 38.4 mg S/g catalyst |
| Ni—ZnO-ZSM-5 (1:1) prepared by incipient wetness impregnation[3] | Model gasoline fuel | 7.34 mg S/g catalyst |
| Ni/ZnO nanowire adsorbent[4] | Naphtha w 900-1000 ppm thiophene | 190 mg S/g catalyst |
| Ni/ZnO nanowire adsorbent[5] | Diesel fuel w 140-1500 ppm thiophene and refractory sulfur species | 223 mg S/g catalyst |

[1]*Acta Pet. Sin.* 2008, 24: 739-743
[2]*Energy Fuels* 2015, 29: 6057-6067
[3]*Transactions of Tianjin University* 2019, 25:143-151
[4]Example 11 herein
[5]Example 10A herein Decorated Nanowire Example 15

Example 13 was repeated with 30 g of Ni/ZnO decorated nanowire adsorbent, and with the diesel oil feedstock replaced with a naphtha feedstock having from 900 ppm to 1000 ppm thiophenic species. The thiophenic species level decreased to 1 ppm for the first approximately 400 hours on stream and the Ni/ZnO adsorbent continues to pick up sulfur until about 19% by wt sulfur level is reached. The theoretical sulfur pickup capacity for the product is 20% by wt, demonstrating the efficacy of the adsorbent.

Figure 5:
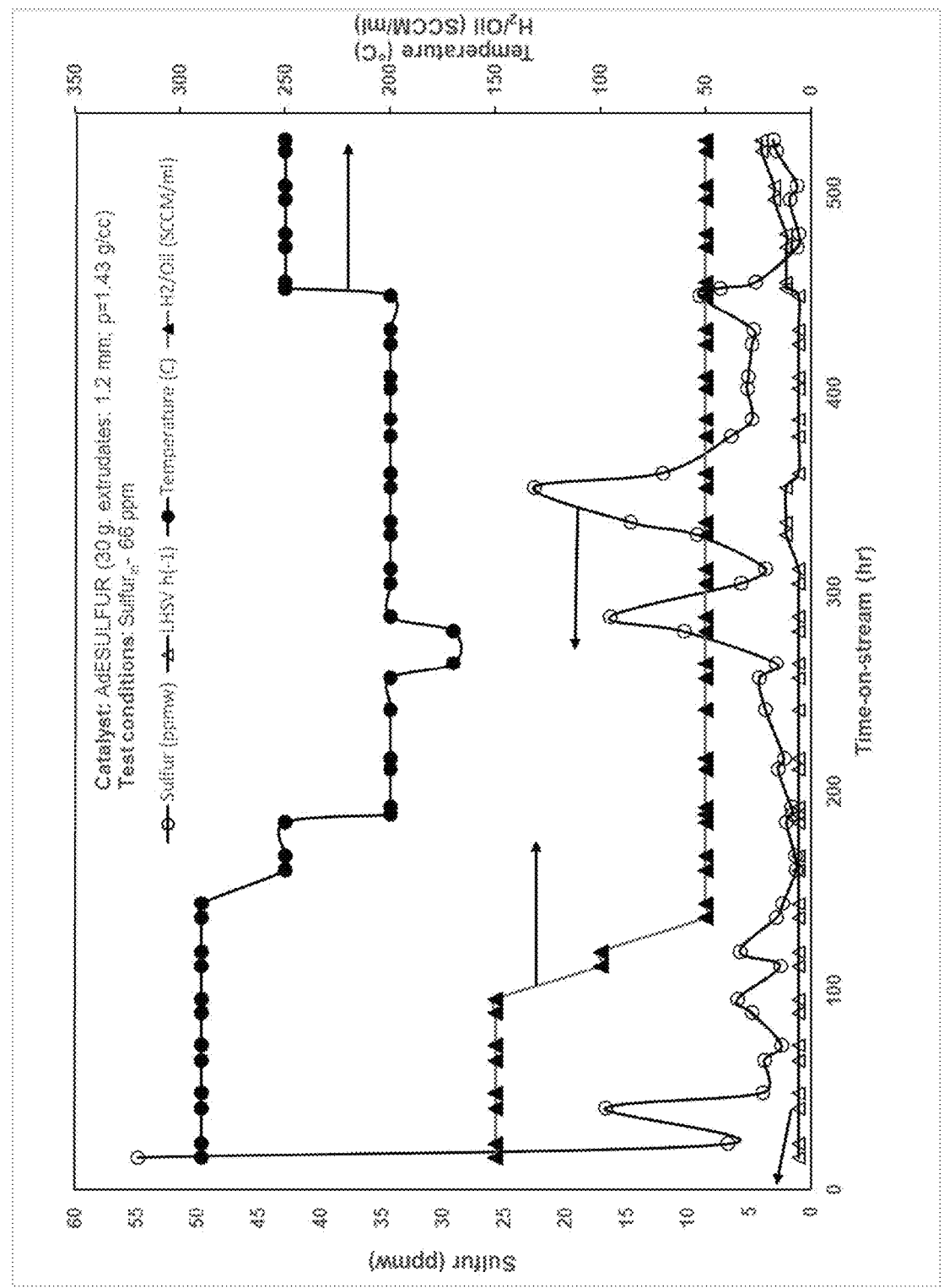
FIG. 5 is a graph showing the effect of temperature on a kerosene desulfurization process using a nickel decorated ZnO nanowire adsorbent.

The effect of $H_2$ to oil, or feedstock, ratio and of reaction temperature was evaluated using ASTM-1-K kerosene feedstock spiked with thiophene. As shown in FIG. 5, using the Ni/ZnO decorated nanowire adsorbent sulfur removal is achieved under relatively mild reaction conditions. For example, sulfur is effectively removed from the feedstock at an $H_2$/oil=50 SCCM/ml (SCCM=standard cubic centimeters per minute; oil=feedstock) at temperatures as low as 200° C. Even after more than 450 hours on stream, the adsorbent can continue to pick up sulfur by maintaining the $H_2$/oil at 50 SCCM/ml and raising the temperatures to 250° C.

Decorated Nanowire Example 16

Example 13 is repeated with 30 g of Ni/ZnO decorated nanowire adsorbent, and with the diesel oil feedstock replaced with an ASTM-1-K kerosene feedstock spiked with thiophene to deliver a total sulfur level of 66 ppmw. The reactor temperature for the desulfurization process was set at 290° C. and the reactor pressurized to 30 bar. The spiked kerosene feedstock passed through the decorated nanowire adsorbent at an LHSV=1 $h^{-1}$ and the $H_2$/oil=150 SCCM/ml. After 100 hours on stream, the $H_2$/oil was decreased to 100 SCCM/ml while maintaining the reactor temperature at 290° C. After an additional 24 hours on stream, the $H_2$/oil was decreased to 50 SCCM/ml while maintaining the reactor temperature at 290° C. After the system stabilized, approximately an additional 24 hours on stream, and while maintaining the $H_2$/oil at 50 SCCM/ml the reactor temperature was lowered over a period of about 48 hours to a temperature of 200° C. Sulfur output remained low and constant. After an additional 48 hours on stream and while maintaining the $H_2$/oil at 50 SCCM/ml, the reactor temperature dropped to a temperature of 170° C. Sulfur breakthrough was observed. Returning the reactor temperature to 200° C. while maintaining the $H_2$/oil at 50 SCCM/ml increased the sulfur adsorption. Increasing the reactor temperature to 250° C. while maintaining the $H_2$/oil at 50 SCCM/ml further increased the sulfur adsorption even after more than 450 hours on stream.

The Ni/ZnO decorated nanowire adsorbent or the $Ni_{1-x}Zn_x/ZnO$ decorated nanowire adsorbent can be used to hydrogenate naphthalene to tetralin even in the presence of sulfur. Moreover, it has been found that the Ni/ZnO decorated nanowire adsorbent and/or the $Ni_{1-x}Zn_x/ZnO$ decorated nanowire adsorbent can selectively do this hydrogenation, that is, the adsorbent selectively converts naphthalene to tetralin even at temperatures as low as 185° C. with a naphthalene conversion of about 92% and selectivity to tetralin about 83-93% over a time on stream of up to 170 hours.

Decorated Nanowire Example 17

Figure 6:
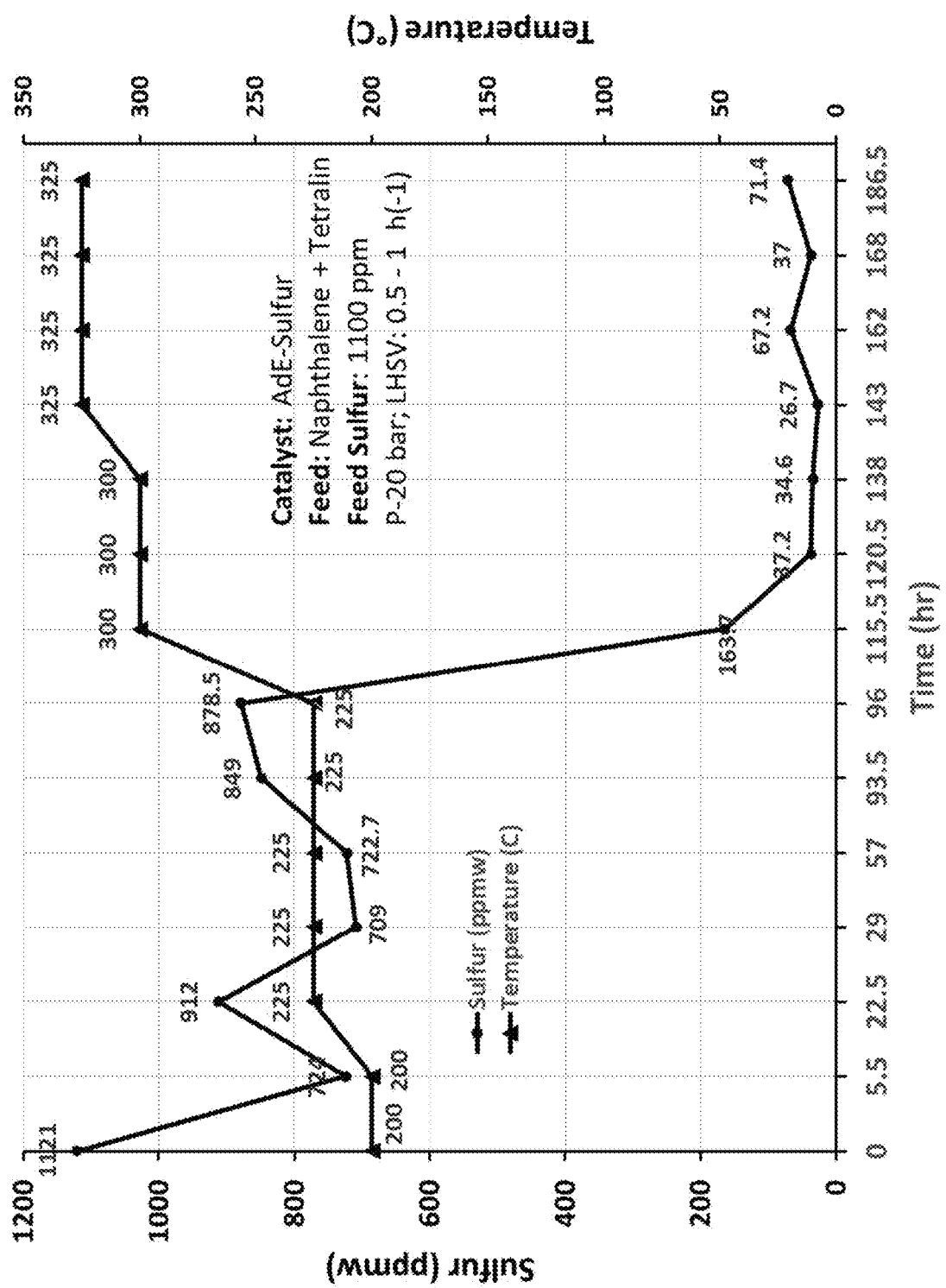
FIG. 6 is a graph showing the reaction temperature and the sulfur level detected at the reactor outlet using a $Ni_{1-x}Zn_x$ alloy decorated on a ZnO nanowire adsorbent to desulfurize naphthalene with P=20 bar, T=200-325° C., LHSV=0.5 $h^{-1}$.

30 g of the 12% Ni-88% ZnO decorated nanowire adsorbent (cylindrical extrudates, D=3 mm, L=5 mm-8 mm; vol=6 cc) from Example 1 is packed into a fixed bed reactor. Prior to introduction of the feedstock, the decorated nanowire adsorbent is pretreated in $N_2$ at 150° C. and then reduced at 430° C. in a hydrogen gas flow. The reactor is then cooled to a temperature of 200° C. and pressurized to 25 bar. The hydrocarbon feedstock, a 25% naphthalene and 75% tetralin blend spiked to deliver 1100 ppm sulfur, is pumped from a top inlet of the reactor and passes through the decorated nanowire adsorbent at a LHSV of 0.5 to 1 $h^{-1}$ before exiting at a bottom outlet of the fixed bed reactor and being collected. After 5.5 hours on stream, the reactor temperature was raised to 225° C. with nominal effect on sulfur removal, as shown in FIG. 6. After an additional 90 hours on stream, the reactor temperature was raised to 300° C. which demonstrates significant sulfur removal. A further reactor temperature increase to 325° C. did not demonstrate further efficacy in sulfur removal. Exemplary results are shown in Table 7.

TABLE 7

| Temp (° C.) | Time on stream (hr) | Naphthalene Conv (%) | Product Selectivity (%) | |
|---|---|---|---|---|
| | | | Tetralin | Decalin |
| 185 | 28.5 | 92.7 | 98.3 | 1.7 |
| 185 | 41 | 88.7 | 99.1 | 0.9 |
| 185 | 51 | 86.7 | 98.6 | 1.4 |
| 200 | 66 | 91.5 | 97.4 | 2.6 |
| 200 | 73 | 94.0 | 89.7 | 9.9 |
| 200 | 90 | 91.1 | 97.8 | 2.7 |
| 200 | 96.5 | 92.3 | 86.5 | 13.5 |
| 200 | 138 | 92.7 | 89.1 | 10.9 |
| 200 | 145 | 95.6 | 92.0 | 7.6 |
| 200 | 162 | 93.1 | 94.4 | 5.6 |
| 200 | 167 | 92.7 | 82.6 | 17.0 |

Decorated Nanowire Example 18

Figure 7:
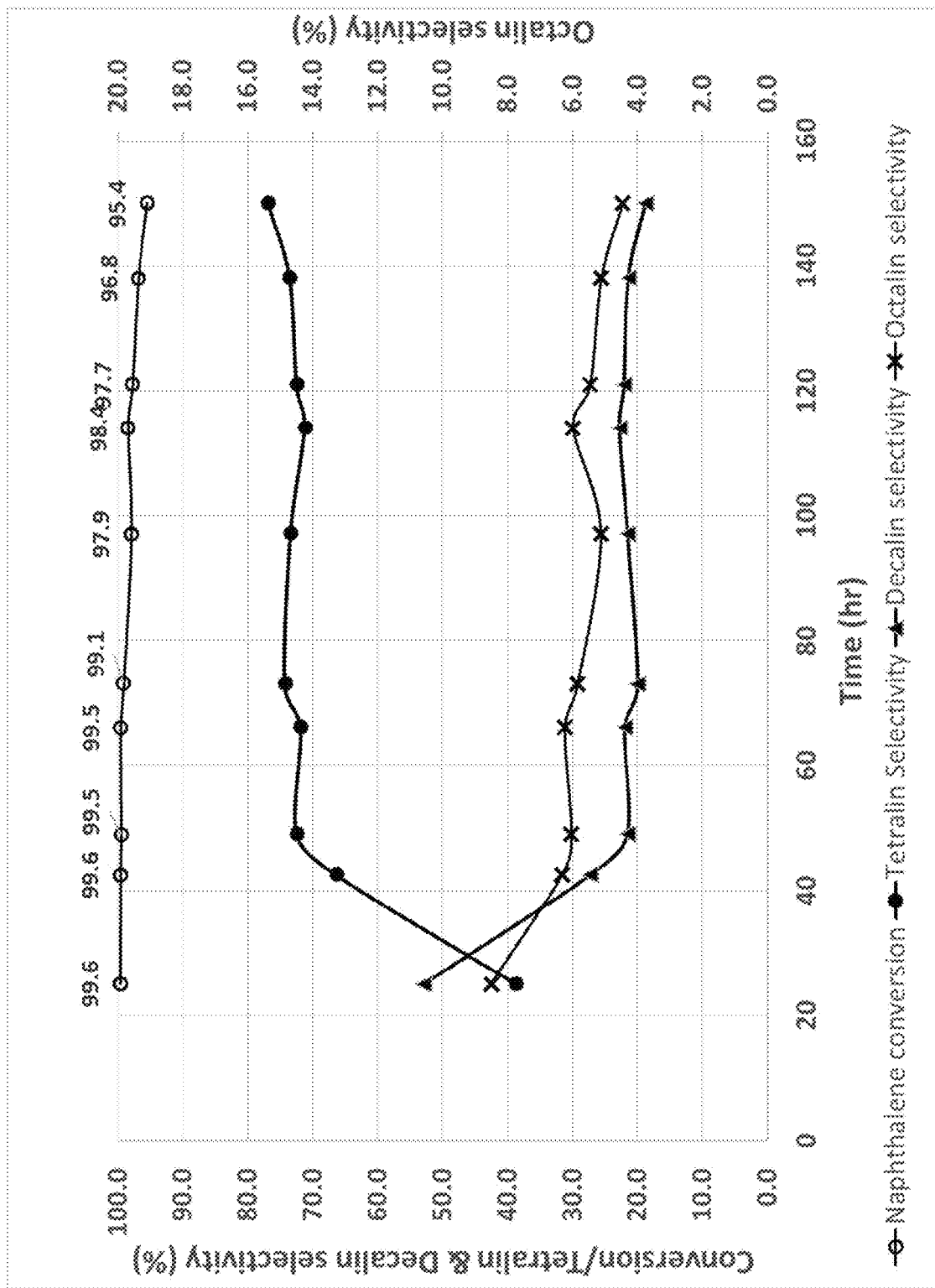
FIG. 7 is a graph showing naphthalene conversion and tetralin and decalin selectivities using a 12% Ni-88% ZnO decorated nanowire adsorbent made according to the present invention.

30 g of the 12% Ni-88% ZnO decorated nanowire adsorbent (cylindrical extrudates, D=2 mm, L=5 mm-8 mm; vol=6 cc) from Example 1 is packed into a fixed bed reactor. Prior to introduction of the feedstock, the decorated nanowire adsorbent is pretreated in $N_2$ at 150° C. and then reduced at 400° C. for 2 hours in a hydrogen gas flow. The reactor is then cooled to a temperature of 200° C. and pressurized to 25 bar. The hydrocarbon feedstock, a 18% naphthalene, 81.7% tetralin and 0.3% decaline blend with 15 ppm sulfur, is pumped from a top inlet of the reactor and passes through the adsorbent at a LHSV of 2 $h^{-1}$ before exiting at a bottom outlet of the fixed bed reactor and being collected. The naphthalene conversion and tetralin an decalin selectivities are shown in FIG. 7.

As noted supra, natural gas contains 4-6 ppm sulfur in the form of $H_2S$, COS, methyl mercaptan, ethyl mercaptan and $^t$butyl mercaptan, and thiophene, as the major sulfur species. Deep desulfurization, reducing the sulfur level to less than 100 ppb, is necessary for most commercial applications. To demonstrate that the nickel-decorated zinc oxide nanowire adsorbent is capable of deep desulfurization of a natural gas stream in a one-step process, a series of experiments were conducted using natural gas streams at varying reactor temperatures, reactor pressures, and at a gas hourly space velocity (GHSV) of 2000 $h^{-1}$ to 6000 $h^{-1}$, more preferably at a GHSV of 4000 $h^{-1}$ to 6000 $h^{-1}$, and most preferably at a GHSV of 5000 $h^{-1}$. As shown in the following examples, the decorated nanowire adsorbent is effective for reducing the sulfur concentration in a natural gas stream in a single step process from about 3-20 ppmv to less than 50 ppbv, and preferably to less than 15 ppbv, and most preferably to less than 1 ppbv.

Decorated Nanowire Example 19

Example 13 was repeated with 30 g of Ni/ZnO decorated nanowire adsorbent (cylindrical extrudates, D=4.2 mm, L=5 mm-8 mm; vol=6 cc), and reduced at 400° C. for 4 hours, and with the diesel oil feedstock replaced with a natural gas feedstock having from up to 30 ppm sulfur. The reactor is then heated to a temperature of 310° C. at atmospheric pressure. The natural gas based mixed gas feedstock then passes through the decorated nanowire adsorbent at atmospheric pressure and at a gas feed flow rate of $CH_4$=149 cc/min and $H_2$=24 cc/min. The mixed feedstock composition is: $CH_4$: 50%-90%; $H_2$: 10%-15%; $CO_2$: 0-5%; water vapor: 0-10%; $N_2$: 0-10%, with a mixture of sulfur species. Table 8 shows the sulfur concentration from samples recovered at the outlet after various times on-stream.

TABLE 8

| Sulfur analysis at outlet (ppm) | | | | | | |
|---|---|---|---|---|---|---|
| Time on stream (h) | $H_2S$ | MM | DMS | $CS_2$ | TBM | TP |
| Feed gas | 2.58 | 0.258 | 0.26 | 0.43 | 2.15 | 0.13 |
| 3 | 0 | 0 | 0 | 0 | 0 | 0 |
| 21 | 0 | 0 | 0 | 0 | 0 | 0 |
| 29 | 0 | 0 | 0 | 0 | 0 | 0 |
| 44.5 | 0 | 0 | 0 | 0 | 0 | 0 |

$H_2S$ = hydrogen sulfide;
MM = methyl mercaptan;
DMS - dimethyl sulfide;
$CS_2$ = carbon disulfide;
TBM = tertiary butyl mercaptan;
TP = thiophene Decorated Nanowire Example 20

Example 19 was repeated with 30 g of Ni/ZnO decorated nanowire adsorbent (cylindrical extrudates, D=1.2 mm, L=5 mm-8 mm; vol-6 cc) except the reactor is heated to a temperature of 350° C. at atmospheric pressure and the natural gas based mixed gas feedstock then passes through decorated nanowire adsorbent at a GHSV of 2000 $h^{-1}$. Table 9 shows the sulfur concentration from samples recovered at the outlet after various times on-stream.

TABLE 9

| Sulfur analysis at outlet | | | | | | |
|---|---|---|---|---|---|---|
| Time on stream (h) | $H_2S$ | MM | DMS | $CS_2$ | TBM | TP |
| Feed gas | 112 ppb | — | 698 ppb | 258 ppb | 1.31 ppm | 0.1 ppm |
| 8 | 0 | 0 | 0 | 0 | 0 | 0 |

$H_2S$ = hydrogen sulfide;
MM = methyl mercaptan;
DMS - dimethyl sulfide;
$CS_2$ = carbon disulfide;
TBM = tertiary butyl mercaptan;
TP = thiophene Decorated Nanowire Example 21

Example 13 was repeated with 30 g of Ni/ZnO decorated nanowire adsorbent (cylindrical extrudates, D=1.2 mm, L=5 mm-8 mm; vol=6 cc), the diesel fuel feedstock was replaced with 98 vol % natural gas+2 vol % hydrogen and the gas was fed into the reactor at a GHSV=2000 $h^{-1}$, the reactor temperature was set at 350° C. and the reactor pressurized to 34+/−2 bar. Table 10 shows the sulfur concentration from samples recovered at the outlet after various times on-stream.

TABLE 10

| Time on stream (h) | $H_2S$ | MM | DMS | $CS_2$ | TBM | TP |
|---|---|---|---|---|---|---|
| Feed gas | 3.0 | 0.3 | 0.3 | 0.5 | 2.5 | 0.15 |
| 4 | 0.05 | 0 | 0 | 0 | 0 | 0.07 |
| 23 | 0.13 | 0 | 0 | 0 | 0 | 0 |
| 70 | 0.14 | 0 | 0 | 0 | 0 | 0 |

Feed gas also contains 0.15 ppm carbonyl sulfide (COS)
$H_2S$ = hydrogen sulfide;
MM = methyl mercaptan;
DMS - dimethyl sulfide;
$CS_2$ = carbon disulfide;
TBM = tertiary butyl mercaptan;
TP = thiophene Decorated Nanowire Example 22

Example 19 was repeated with 30 g of Ni/ZnO decorated nanowire adsorbent (cylindrical extrudates, D=4.2 mm, L=5 mm-8 mm; vol=6 cc), except the feedstock is natural gas with 10 ppm tetrahydrothiophene in the presence of 3% $CO_2$. The natural gas feedstock passes through the decorated nanowire adsorbent at atmospheric pressure and at a gas feed flow rate of $CH_4$=148.5 cc/min, $CO_2$=6.0 cc/min, $N_2$=7.8 cc/min and $H_2$=25.8 cc/min. In one run, 5.5 vol % water vapor is added to the feedstock at a gas flow rate of 10 cc/min. Table 10 shows the sulfur concentration from samples recovered at the outlet. Although not included in Table 10, the 290° C. test extended to more than 550 hours on stream with no sulfur detected and the 310° C. test extended to more than 412 hours on stream with no sulfur detected at the outlet.

As also indicated in Table 11, the nickel-decorated zinc oxide nanowire adsorbent not only removes sulfur from the natural gas stream, but it is also effective for conversion of carbon dioxide in the natural gas to methane.

TABLE 11

| | | Sulfur analysis at outlet (ppm) | | | |
|---|---|---|---|---|---|
| | | With Water Vapor | | Without Water Vapor | |
| Temp (° C.) | Time on stream (h) | $CO_2$ Conv (%) | Sulfur (ppmv) | $CO_2$ Conv (%) | Sulfur (ppmv) |
| 270 | 4 | z | z | 36 | 0 |
| 270 | 8 | | | 34.4 | 0 |
| 270 | 24 | 6.3 | 0 | not tested | |
| 290 | 24 | 9.2 | 0 | | |
| 290 | 486 | 4.5 | 0 | not tested | |
| 290 | 507 | 4.3 | 0 | not tested | |
| 290 | 526 | 4.3 | 0 | not tested | |
| 310 | 4 | | | 44.8 | 0 |
| 310 | 8 | | | 44.3 | 0 |
| 310 | 18 | 15.8 | 0 | not tested | |
| 310 | 296 | 14.4 | 0 | not tested | |
| 310 | 388 | 14.2 | 0 | not tested | |

The reactions described herein may be carried out in the packed-bed reactor process or batch reactor process at moderate pressure and temperatures.

As demonstrated herein, the $Ni_{1-x}Zn_x$/ZnO decorated nanowire catalyst is active in desulfurization of natural gas with a sulfur level of 6-7 ppm, wherein the sulfur is found in a variety of sources, including but not limited to $H_2S$, COS, $CS_2$, mercaptans, and thiophene, at atmospheric pressure and as well as at 35 bar, conditions that are relevant to fuel cells and $H_2$/syngas production plants respectively. As demonstrated herein, the $Ni_{1-x}Zn_x$/ZnO decorated nanowire catalyst is active in desulfurization of natural gas under more rigorous conditions, including relatively low reaction temperatures, e.g. 150° C.-200° C., and gas hourly space velocities from 2000 $h^{-1}$ to 6000 $h^{-1}$ for long on-stream times. As is known in the art, the spent catalysts may be harvested for metal recovery.

It has also been observed that the decorated nanowire adsorbents of the present invention, and in particular the nickel on zinc oxide (Ni—ZnO) decorated nanowire adsorbents, can be used in natural gas desulfurization processes with an intermittent hydrogen gas supply. For example, using the Apparatus Arrangement with a decorated Ni—ZnO first adsorbent and a decorated Ni—ZnO second adsorbent, and with a natural gas feed, and intermittently adding $H_2$ for from about 2 hours to about 3 hours whenever a sulfur breakthrough of less than about 20 wt % occurs, significant sulfur uptake was observed, as shown in Table 12. The higher nickel loading leads to a higher capacity under no hydrogen conditions.

TABLE 12

| Test No | ADEM test condition | Sulfur species and concentration (ppmv) in feed | Outcome |
|---|---|---|---|
| A | T - 368° C.<br>GHSV-2,700 $h^{-1}$<br>P - atmospheric<br>Catalyst - reduced | $^t$Butyl mercaptan: 1000 ppmv<br>tetrahydro thiophene: 1000 ppmv | Sulfur uptake - 3.1 wt %.<br>Breakthrough sulfur - 100 ppbv |
| B | Initial T - 204° C.<br>Final T - 368° C.<br>Ramp time - 4 h<br>GHSV - 10,500 $h^{-1}$<br>P - atmospheric<br>Catalyst - reduced | $^t$Butyl mercaptan: 50 ppmv<br>tetrahydro thiophene: 50 ppmv | Sulfur uptake - 1.4 wt % at 100 ppbv breakthrough<br>1.8 wt % at 5 ppmv breakthrough |
| C | Initial T - 204° C.<br>Final T - 368° C.<br>Ramp time - 4 h<br>GHSV - 10,500 $h^{-1}$<br>P - atmospheric<br>Catalyst - calcined | $^t$Butyl mercaptan: 50 ppmv<br>tetrahydro thiophene: 50 ppmv | Breakthrough of 50 ppmv at 400 F. and 20 ppmv at 695 F. |

TABLE 12-continued

| Test No | ADEM test condition | Sulfur species and concentration (ppmv) in feed | Outcome |
|---|---|---|---|
| D | T - 368° C.<br>GHSV-10,500 h$^{-1}$<br>P - atmospheric<br>Catalyst - Reduced<br>Bed pre-saturated to 10 wt % sulfur | COS: 50 ppmv<br>$^t$Butyl mercaptan: 50 ppmv | Sulfur uptake - 1.2 wt % at breakthrough of 100 ppbv. |
| E | T - 368° C.<br>GHSV - 10,500 h$^{-1}$<br>P - atmospheric<br>Catalyst - reduced<br>Bed pre-saturated to 15 wt % sulfur | COS: 50 ppmv<br>$^t$Butyl mercaptan: 50 ppmv | Sulfur uptake - 0.8 wt % at breakthrough of 2.6 ppmv of COS and 0.6 ppmv of TBM.<br>1.0 wt % pickup at breakthrough of 27 ppmv of COS and 2.6 ppmv of TBM |
| F | T - 368° C.<br>GHSV - 10,500 h$^{-1}$<br>P - atmospheric<br>Catalyst - reduced<br>Bed pre-saturated to 20 wt % sulfur | COS: 50 ppmv<br>$^t$Butyl mercaptan: 50 ppmv | Sulfur uptake - 0.9 wt % at breakthrough of 27 ppmv of COS and 3 ppmv of TBM |

By adding from about 1 vol % to about 3 vol % hydrogen gas to the feed gas, the Ni—ZnO decorated nanowire adsorbent has also demonstrated efficiency in removing sulfur from hydrocarbon gas streams and in preventing hydrogenation of olefins in the hydrocarbon gas stream, as shown in Table 13.

TABLE 13

| Processing conditions: T = 225° C., P = atmospheric, $H_2$ = 2 vol %, absorbent = Ni—Zno | | |
|---|---|---|
| Sample | Before treatment | After treatment |
| Sulfur, ppmv | 70 | <1 |
| $C_1$ | 0.02 | 0 |
| $C_3$ | 9.1 | 8.4 |
| $C_3=$ | 9.9 | 9.1 |
| $iC_4$ | 25.1 | 24.8 |
| $nC_4$ | 23.0 | 23.3 |
| 1-Butene | 6.7 | 7.9 |
| iso-Butene | 10.1 | 10.2 |
| Trans 2-butene | 8.6 | 8.4 |
| Cis 2-butene | 5.7 | 5.7 |
| 1,3-Butadiene | 0.04 | 0.09 |
| $iC_5$ | 1.6 | 1.5 |

Desulfurization Using Alloyed Nanowire Adsorbents: It has been found that the alloyed nickel zinc oxide nanowire adsorbent is also useful for the desulfurization of liquid fuel feedstocks and hydrocarbon feedstocks, such as waste lube oil, transmix fuels, diesel fuel, gasoline, naphtha, light cycle oil, diesel, jet fuel, kerosene, and combinations thereof. Further, the Ni/ZnO alloyed nanowire adsorbent of the present invention is effective for sulfur pickup at significantly higher levels than prior art catalysts or adsorbents. Specifically, the Ni/ZnO alloyed nanowire of the present invention has a sulfur pickup equal to or greater than 150 mg S/g catalyst, and more preferably has a sulfur pickup equal to or greater than 180 mg S/g catalyst, and most preferably has a sulfur pickup equal to or greater than 220 mg S/g catalyst. Using the Ni/ZnO alloyed nanowire to treat a diesel feedstock reduces the sulfur level from 300 ppm down to <5 ppm, and results in fuel upgrading (increased cetane number) by increasing the cetane number from 48 to 60. For this application, hydrogen is included in the process and the amount of hydrogen required is about 600-1000 SCF/barrel. Using the Ni/ZnO alloyed nanowire to treat a naphtha feed having 1000 ppm thiophene sulfur at 350° C. and 20 bar results in deep desulfurization with the sulfur level after treatment at <5 ppm sulfur, and shows the decorated adsorbent has a pickup capacity equal to 20 wt %.

Alloyed Nanowire Adsorbent Preparation, Example 23

A 12% Ni-88% ZnO alloyed nanowire is prepared by dispersing 8.8 g of ZnO nanowires in about 20 mL distilled $H_2O$ and mixing to form a slurry. A 17 wt % aqueous solution of nickel acetate tetrahydrate is then added dropwise to the slurry while stirring and while maintaining the nanowire solution pH at 8.0 using $NH_4OH$ solution. The nickel-ZnO slurry is dried in an oven at about 120° C. for approximately 15 hours. The dried nickel-ZnO is then calcined under vacuum for about 3 hr at about 450° C. The calcined material is cooled to room temperature and mixed with binder and water, and then extruded as approximately 2 mm diameter cylinders.

As is known in the art, a challenge in the desulfurization of naphtha from a fluid catalytic cracking (FCC) unit of a refinery is that using conventional hydrotreaters can result in olefins in the naphtha being saturated with hydrogen and thereby losing the octane number. The use of the adsorbent of Example 23 has been shown to be capable of desulfurizing the naphtha while retaining the octane number.

Alloyed Nanowire Example 24

The alloyed nanowire adsorbent from Example 23 was evaluated for use in the desulfurization of naphtha from a fluid catalytic cracking (FCC) unit of a refinery. The FCC naphtha contained from about 25 vol % to about 50 vol % olefins and from about 60 ppmw to about 250 ppmw sulfur. About 30 g Ni—ZnO alloyed nanowire adsorbent from Example 23 and about 60 g SiC powder were mixed and packed into a fixed bed reactor. Prior to introduction of an FCC naphtha feedstock, the adsorbent temperature was raised to 200° C. or to 270° C. while maintaining a $H_2$ gas flow and adjusting the reactor pressure to 290±30 psi. The FCC naphtha feedstock, with 81 ppmw sulfur, was pumped through the adsorbent at a liquid hourly space velocity of 1 to 2 h$^{-1}$. The $H_2$/oil was set to 30 SCFBBL at LHSV-2 h$^{-1}$. As shown in Table 14, the alloyed nanowire adsorbent prepared according to the method of Example 23 shows efficient desulfurization of FCC naphtha feedstock while retaining the octane level of the naphtha feedstock. Without being bound by theory, it is believed that the improved activity of the alloyed nanowire catalyst is due to atomic dispersion of Ni metal into the zinc oxide nanowire, and the proximity of the zinc metal enables more efficient transfer of the sulfur from the nickel particles to the zinc-oxide support.

TABLE 14

Feedstock = FCC naphtha; Processing conditions:
P = 290 atm, $H_2$/oil = 30 SCFBBL

| Catalyst | Temp (° C.) | LHSV ($h^{-1}$) | Bromine Number | Sulfur (ppmw) |
|---|---|---|---|---|
| No catalyst | 275 | 2 | 47 +/− 2 | 81 |
| 90 wt % $Ni_{0.12}Zn_{0.88}O$ + 10% binder | 275 | 2 | 45 +/− 2 | 4.5 |
| 90 wt % $Ni_{0.12}Zn_{0.88}O$ + 10% binder | 275 | 1 | 37 +/− 2 | 4 |
| 90 wt % $Ni_{0.12}Zn_{0.88}O$ + 10% binder | 220 | 2 | 42 +/− 2 | 14 |
| 10.7 wt % Ni-80.3 wt % ZnO-9 wt % binder | 275 | 2 | 43 +/− 2 | 20 |
| 10.7 wt % Ni-80.3 wt % ZnO-9 wt % binder | 275 | 1 | 39 | 7 +/− 2 |
| 10.7 wt % Ni-80.3 wt % ZnO-9 wt % binder | 200 | 1 | n/a | 33 |

After 110 hours on stream with the naphtha feedstock, the feed was switched to a kerosene feedstock having 780 ppmw of sulfur. The reactor temperature was adjusted to 370° C. and an $H_2$/oil-840 SCFBBL, and the desulfurization process was continued for an additional 96 hours. The sulfur in the exit stream was found to be 6-12 ppmw after 96 h on stream. The total sulfur adsorbed onto the catalyst was 4.4 wt %. The feed was then returned to the FCC naphtha feedstock and the temperature adjusted to the original naphtha desulfurization reaction conditions. The sulfur in the product stream was 25 ppmw using the adsorbent at 200° C. and 5 ppmw using the adsorbent at 270° C.

Alloyed Nanowire Example 25

About 30 g 11 wt % Ni-81 wt % ZnO-8 wt % boehmite alloyed nanowire adsorbent prepared according to the method of Example 23 and about 60 g SiC powder were mixed and packed into a fixed bed reactor. Prior to introduction of the FCC naphtha feedstock, the alloyed nanowire adsorbent was pretreated using $H_2$ gas at 400° C. The reactor temperature was then adjusted to from about 250° C. to about 290° C. while maintaining a $H_2$ gas flow and adjusting the reactor pressure to 290±30 psi. The FCC naphtha feedstock, with 76 ppmw sulfur, was pumped through the alloyed nanowire adsorbent at a liquid hourly space velocity of 2 $h^{-1}$. For the desulfurization run at 250° C., the sulfur level from the feedstock was reduced to about 25 ppmw. For the desulfurization run at 290° C., the sulfur level from the feedstock was reduced to about 12 ppmw.

As noted above, the Ni—ZnO alloyed nanowire adsorbent is effective for desulfurizing FCC naphtha feed while retaining the octane composition of the feed. Representative results are shown in Table 15 for a Ni—ZnO alloyed nanowire adsorbent.

TABLE 15

Feedstock = FCC naphtha; Processing conditions:
P = 290 psi, $H_2$/oil = 50 SCFBBL, T = 250° C.-350° C.
Catalyst: 11% Ni—81% ZnO - 8% boehmite, reduced before use

| Component | Untreated Feed | Treated with LHSV = 2 $h^{-1}$ | Treated with LHSV = 1 $h^{-1}$ |
|---|---|---|---|
| Sulfur (ppm) | 210 | 30 | 20 |
| Paraffins (vol %) | 8.0 | 8.3 | 7.6 |
| Iso-paraffins (vol %) | 37.9 | 38.9 | 38.5 |
| Olefins (vol %) | 30.4 | 26.0 | 25.6 |
| Naphthenes (vol %) | 10.4 | 11.9 | 12.2 |
| Aromatics (vol %) | 13.0 | 14.2 | 15.4 |
| Unknowns (vol % | 0.3 | 0.6 | 0.7 |
| Research Octane Number (RON) | 89.7 | 88.9 | 89.1 |
| Motor Octane Number (MON) | 80.2 | 80.0 | 80.1 |
| R + M/2 | 85.0 | 84.5 | 84.6 |

RON and MON measured according to ASTM D2700

Figure 8:
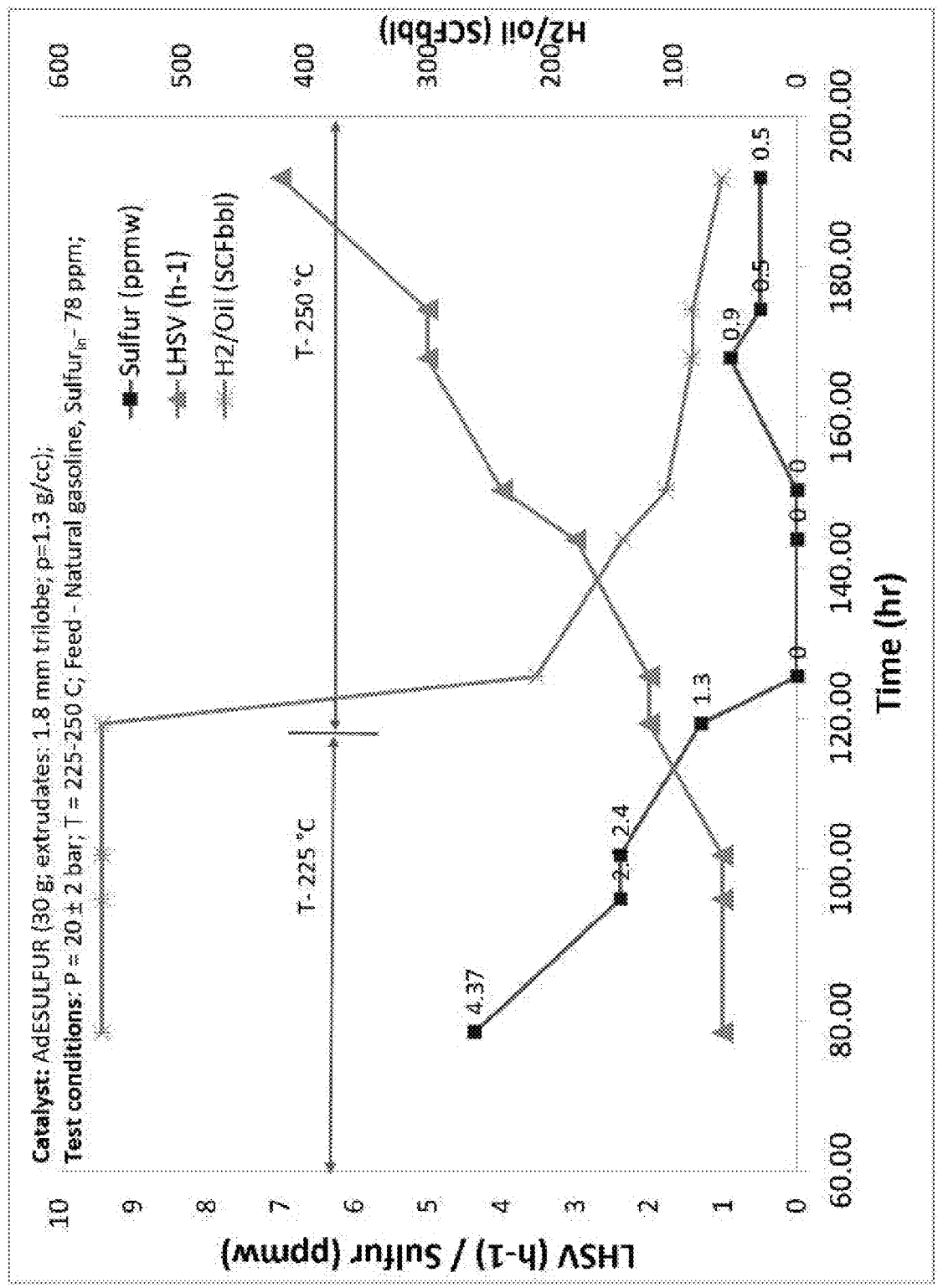
FIG. 8 is a graph showing desulfurization of a natural gasoline feedstock using a 12% Ni-88% ZnO alloyed nanowire adsorbent made according to the present invention.
Figure 9:
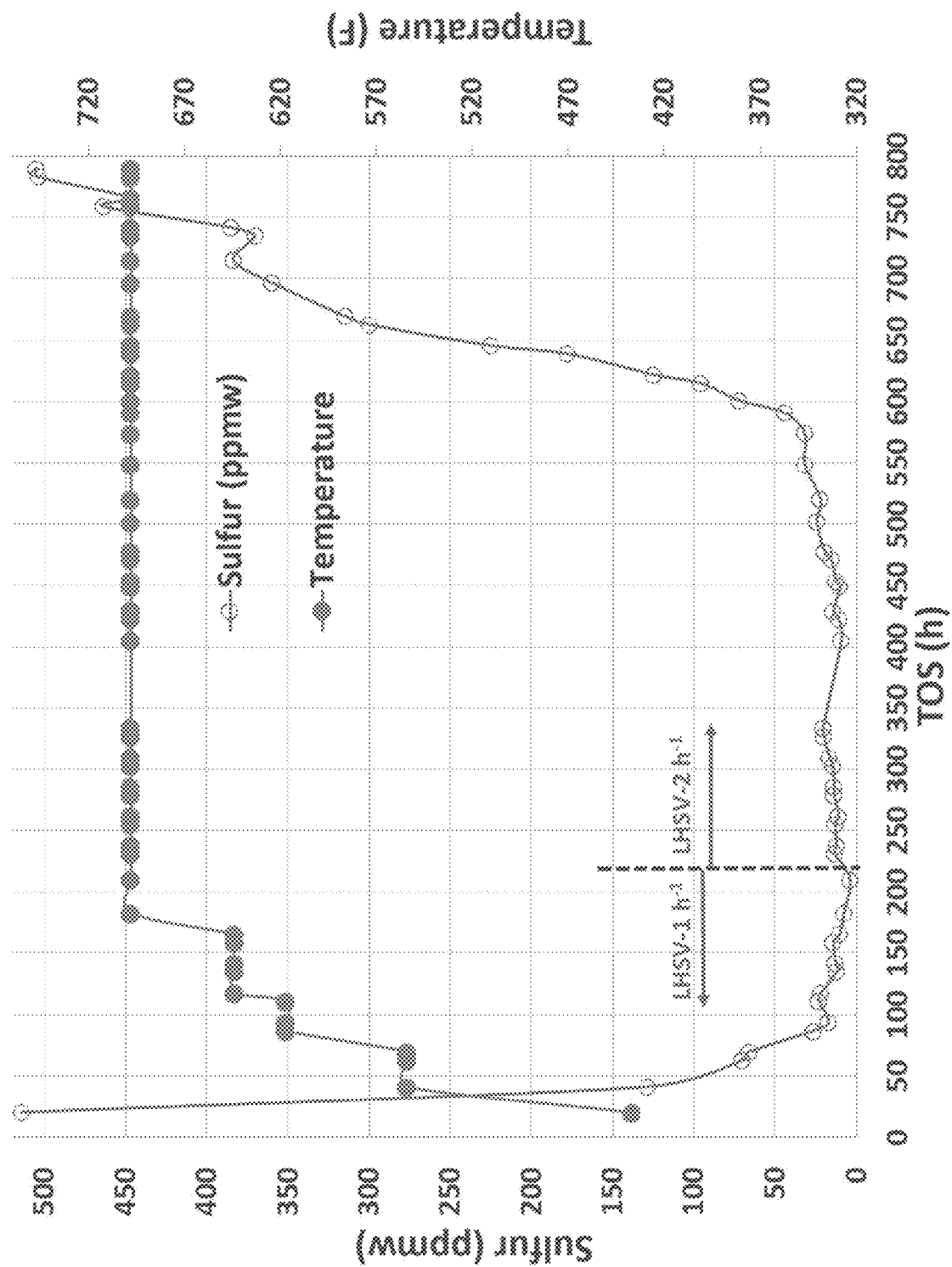
FIG. 9 is a graph showing desulfurization of a kerosene feedstock using a 12% Ni-88% ZnO alloyed nanowire adsorbent made according to the present invention; and, FIG. 10 is a graph showing the sulfur breakthrough capacity for a 12% Ni-88% ZnO alloyed nanowire adsorbent made according to the present invention when the adsorbent is fresh and after it has been regenerated.
Figure 10:
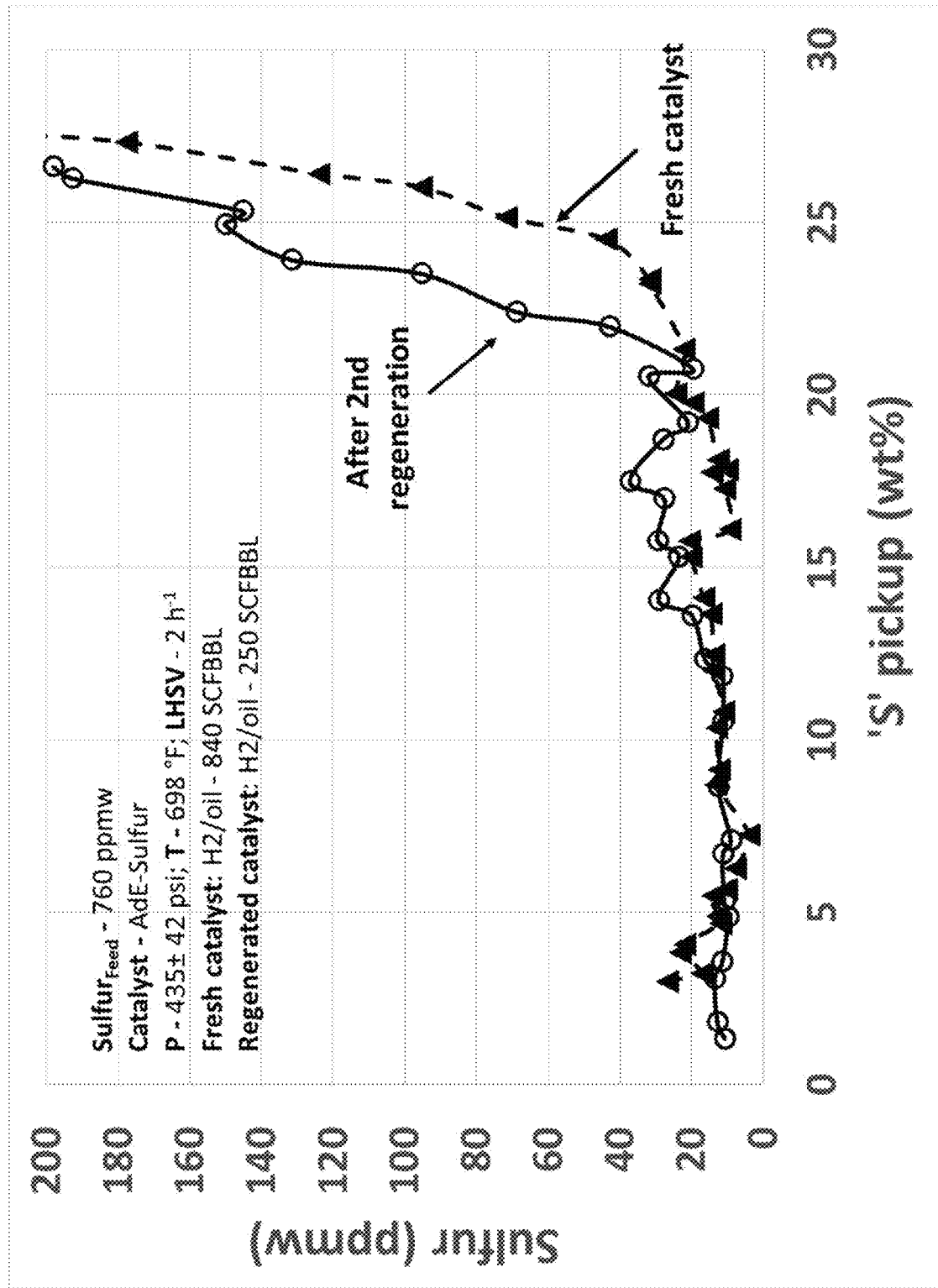

As shown in FIGS. 8 and 9, the Ni—ZnO alloyed nanowire adsorbent, is also effective for desulfurization of natural gasoline feedstocks and of kerosene feedstocks. The adsorbent can be regenerated by flushing with air and water at a temperature of about 550° C. for about 14 hours. As shown in FIG. 10, the regenerated adsorbent demonstrates desulfurization activity similar to fresh adsorbent with sulfur breakthrough (<20 ppmw) capacity at about 22 wt %.

The metal oxide nanowires with the catalytically-active metal particles of the present invention are intended to be used in a desulfurization process without adding external hydrogen or by using lower amounts of hydrogen than required by traditional hydrodesulfurization conditions. The use of nanowire-structured adsorbents is expected to result in improved mass-transfer and an improved mechanical behavior during high temperature operation. Further, these nanowires are expected to offer rapid reaction rates that overcome the diffusion limitations of conventional pellet-based adsorbents and allow all of the material to be used efficiently. It is anticipated that the adsorbents of the present invention may be used in the desulfurization of hydrocarbon fuels commonly found in the oil refining including, but not limited to, waste lube oil, light cycle oil, diesel, jet fuel, kerosene, and combinations thereof.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. The term "ambient temperature" as used herein refers to an environmental temperature of from about 0° F. to about 120° F., inclusive.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

As used herein, the term "Bromine Number" or "$Br_2$ Number" refers to the calculated value for evaluation of FCC naphtha sample using the ASTM-D1159 method. As is known in the art, $$Br_2 \text{ Number} = (VBr_2 \times 0.25 \text{ mol/L} \times 159.880 \text{ g/mol} \times F_x \times 100)/(W_s \times 1000) \quad \text{Eq. 1}$$

wherein $VBr_2$ is the volume of $Br_2$ titrated, $F_x$ is the dilution factor, and $W_s$ is the weight in grams of the fuel sample.

All compositional percentages used herein are presented on a "by weight" basis, unless designated otherwise. Specific compositions are provided herein for the purpose of demonstrating the invention, but these compositions are not intended to limit the scope of the invention. It is understood that one skilled in the art may make alterations to the embodiments shown and described herein without departing from the scope of the invention.

What is claimed is:

1. An absorbent for the liquid phase desulfurization of a sulfur-containing hydrocarbon feedstock wherein the absorbent is an alloyed nanowire absorbent comprising zinc oxide and catalytically-active metal particle, wherein all the catalytically-active metal particles are located within and not on the surface of, the nanowire.

2. The adsorbent of claim 1 wherein the catalytically-active metal particles are selected from nickel metal or copper metal or a combination thereof.

3. The adsorbent of claim 2 wherein the alloyed nanowire adsorbent comprises nickel or copper at a concentration of from about 6 wt % to about 16 wt %, and comprises zinc oxide nanowires at a concentration of from about 70 wt % to about 88 wt %.

4. The adsorbent of claim 1 wherein the alloyed nanowire adsorbent further comprises a binder.

5. The adsorbent of claim 2 wherein the alloyed nanowire adsorbent is prepared by: (a) providing a zinc oxide nanowire powder; (b) dispersing the nanowire in water to form a slurry; (c) providing a catalytically-active metal selected from nickel metal or copper metal or a combination thereof as an aqueous solution, wherein the catalytically-active metal may be provided in a precursor form; (d) adding the catalytically-active metal solution dropwise to the nanowire slurry while controlling the pH between 7.0-9.0; (e) drying the nanowire-active metal slurry of step (d) at a temperature of from about 80° C. to about 150° C. for a predetermined time period until a thick paste or powder forms; (f) calcining the powder in a furnace under inert atmosphere or at vacuum conditions at a calcination temperature of from about 180° C. to about 600° C. for a predetermined time period of from about 2 hr to about 8 hr; (g) cooling the reactor and calcined powder to ambient temperature; (h) adding water and from about 7 wt % to about 12 wt % binder to the calcined powder and mixing for form a paste; (i) extruding the paste of step (h) to form extrudates, preferably of from about 1 mm to about 4.2 mm cylinder size in diameter; and, (j) drying the extrudates in a vacuum oven at a temperature of from about 80° C. to about 200° C. for a predetermined time.

6. The adsorbent of claim 5 wherein the alloyed nanowire adsorbent does not require reduction or activation.

7. The adsorbent of claim 5 wherein the catalytically-active metal is provided in a precursor form as a metal acetate, a metal nitrate, a metal formate, a metal oxalate, or a combination thereof.

8. The adsorbent of claim 5 wherein the drying in step (e) is from about 100° C. to about 120° C.

9. The adsorbent of claim 5 wherein the calcination in step (f) is at a temperature of from about 220° C. to about 400° C.

10. The adsorbent of claim 5 wherein the calcination in step (f) is for a time of from about 3 hr to about 6 hr.

11. The adsorbent of claim 5 wherein the extrudates are dried in step (1) at a temperature of from about 100° C. to about 150° C.

12. An adsorbent for the liquid phase desulfurization of a sulfur-containing hydrocarbon feedstock wherein the adsorbent is an alloyed nanowire adsorbent prepared by: (a) providing a zinc oxide nanowire powder; (b) dispersing the nanowire in water to form a slurry; (c) providing a catalytically-active metal selected from nickel metal or copper metal or a combination thereof as an aqueous solution, wherein the catalytically-active metal may be provided in a precursor form; (d) adding the catalytically-active metal solution dropwise to the nanowire slurry while controlling the pH between 7.0-9.0; (e) drying the nanowire-active metal slurry of step (d) at a temperature of from about 80° C. to about 150° C. for a predetermined time period until a thick paste or powder forms: (f) calcining the powder in a furnace under inert atmosphere or at vacuum conditions at a calcination temperature of from about 180° C. to about 600° C. for a predetermined time period of from about 2 hr to about 8 hr; (g) cooling the reactor and calcined powder to ambient temperature; (h) adding water and from about 7 wt % to about 12 wt % binder to the calcined powder and mixing for form a paste; (i) extruding the paste of step (h) to form extrudates, from about 1 mm to about 4.2 mm cylinder size in diameter; and, (j) drying the extrudates in a vacuum oven at a temperature of from about 80° C. to about 200° C. for a predetermined time.

\* \* \* \* \*